(12) United States Patent
Kawatoko et al.

(10) Patent No.: US 11,340,095 B2
(45) Date of Patent: May 24, 2022

(54) ENCODER AND DETECTION HEAD OF ENCODER

(71) Applicant: Mitutoyo Corporation, Kanagawa (JP)

(72) Inventors: Osamu Kawatoko, Toride (JP);
Toshihiro Hasegawa, Asaka (JP);
Tomohiro Tahara, Machida (JP); Akio Kawai, Yokohama (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/077,313

(22) Filed: Oct. 22, 2020

(65) Prior Publication Data
US 2021/0131831 A1    May 6, 2021

(30) Foreign Application Priority Data
Nov. 1, 2019    (JP) .............................. JP2019-199803

(51) Int. Cl.
*G01D 5/20* (2006.01)
*G01B 7/00* (2006.01)
*G01B 3/20* (2006.01)

(52) U.S. Cl.
CPC ........... *G01D 5/2086* (2013.01); *G01B 3/205* (2013.01); *G01B 7/003* (2013.01)

(58) Field of Classification Search
CPC .......... G01B 7/003; G01B 3/205; G01B 7/00; G01B 3/20; G01B 7/30; G01D 5/20; G01D 5/2046; G01D 5/2452; G01D 5/2053; G01D 5/2086; G01D 1/00; H01F 1/00
See application file for complete search history.

(56) References Cited

U.S. PATENT DOCUMENTS 6,005,387 A    12/1999   Andermo et al.
6,054,851 A *   4/2000   Masreliez ............ G01D 5/2053
                                                    324/207.17

FOREIGN PATENT DOCUMENTS

JP            3366855         1/2003

* cited by examiner

*Primary Examiner* — Jermele M Hollington
*Assistant Examiner* — Suresh K Rajaputra
(74) *Attorney, Agent, or Firm* — Rankin, Hill & Clark LLP

(57) ABSTRACT

An object is to respectively excite transmission coils with different voltages using a single power supply with low power consumption in an electromagnetic induction type encoder. A detection head of an encoder includes a voltage adjustment circuit and a plurality of excitation circuits. The excitation circuit includes a resonant circuit that includes a driving capacitor and a transmission coil connected in series and generates an alternate-current magnetic field inducing currents in scale coils disposed in a plurality of scale tracks on a scale by connecting both ends of the resonant circuit in a state in which the driving capacitor is charged. The voltage adjustment circuit includes a first transformer capacitor and controls a charging voltage of the driving capacitor in a single excitation circuit using the charged first transformer capacitor.

16 Claims, 27 Drawing Sheets

ENCODER AND DETECTION HEAD OF ENCODER

INCORPORATION BY REFERENCE

This application is based upon and claims the benefit of priority from Japanese patent application No. 2019-199803, filed on Nov. 1, 2019, the disclosure of which is incorporated herein in its entirety by reference.

BACKGROUND

The present disclosure relates to an encoder and a detection head of an encoder.

In an electromagnetic induction type absolute displacement detector (encoder), it is known that, as a method for driving a transmission coil in a magnetic field generator, an excitation circuit including the transmission coil and a capacitor is used (e.g. Japanese patent No. 3366855). In this configuration, by using a first switch and a second switch connected in series between a power supply voltage and a ground, applying the power supply voltage to the capacitor in the excitation circuit through the first switch to charge electric charge in the capacitor, and turning on the second switch, a resonant circuit is formed and an alternative magnetic field is generated from the transmission coil by an alternative signal from the transmission coil.

In the case of the absolute encoder, since a track configuration including a plurality of scales having different wavelengths may be adopted, it is necessary to dispose the excitation circuit and a demodulation circuit for each track. Signal intensities of the tracks are not necessarily the same as each other due to a limitation of a substrate area and difference of detection targets (e.g. Linear type and rotary type). In order to detect an absolute position, one track (Sub track) is used as an auxiliary track, and, in many cases, the auxiliary track does not require a signal intensity as strong as that of a main track. However, when the signal intensities between the main track and the sub track are greatly different, the detection signal exceeds a dynamic range of a circuit, and an accurate position may not be detected. Therefore, it is desirable to change the driving voltage of the transmission coil for each track so that the signal strength is as equal as possible.

SUMMARY

As described above, in order to equalize the strength of the signals applied to a plurality of scales, it is conceivable to adopt a configuration in which a plurality of power supplies are prepared and the capacitors of the excitation circuits provided for the respective tracks are charged. However, since a battery is often used as a power supply in a hand tool such as a vernier caliper, the position information is designed so as not to change easily in response to a change in a battery voltage. For example, by designing a reference voltage of an analog-to-digital converter (ADC) so as to be proportional to the power supply voltage, even when the driving voltage of the transmission coil changes due to a change in the power supply voltage, output data of the ADC itself does not significantly change.

Therefore, it is desirable that the power supplies for driving the transmission coils are proportional to a voltage variation of a single power supply. It can be considerable that the power supply proportional to the power supply voltage is achieved by dividing the power supply voltage by resistance-voltage division and by providing a buffer circuit with the divided voltages. However, not only the power is consumed by the resistance voltage division, but also the buffer circuits consume the power, and thereby resulting in a decrease in battery life.

The present disclosure has been made in view of the above circumstances. An object of the present disclosure is to respectively excite transmission coils with different voltages using a single power supply with low power consumption in an electromagnetic induction type encoder.

A first aspect of the present disclosure is a detection head of an encoder including: a plurality of excitation circuits respectively including a resonant circuit that includes a driving capacitor and a transmission coil connected in series and configured to generate an alternate-current magnetic field inducing currents in scale coils disposed in a plurality of scale tracks on a scale by connecting both ends of the resonant circuit in a state in which the driving capacitor is charged; and a voltage adjustment circuit including a first transformer capacitor and configured to control a charging voltage of the driving capacitor in a single excitation circuit using the charged first transformer capacitor.

A second aspect of the present disclosure is the above detection head, in which the single excitation circuit includes: a first switch, one end thereof being connected to the voltage adjustment circuit; and a second switch, one end thereof being connected to the other end of the first switch and the other end thereof being connected to a ground, one end of the driving capacitor is connected between the first switch and the second switch, one end of the transmission coil is connected to the other end of the driving capacitor and the other end thereof is connected to the ground, the driving capacitor is charged by turning on the first switch and turning off the second switch, and after charging the driving capacitor, the transmission coil generates the alternate-current magnetic field by turning off the first switch and turning on the second switch.

A third aspect of the present disclosure is the above detection head, in which the voltage adjustment circuit is configured as a switched capacitor circuit that charges the driving capacitor by a voltage generated by stepping up or stepping down a power supply voltage output from a power supply.

A fourth aspect of the present disclosure is the above detection head, in which the switched capacitor circuit includes: a third switch, one end thereof being connected to the ground; a fourth switch, one end thereof being connected to the other end of the third switch and one end of the first transformer capacitor, and the other end thereof being connected to the power supply; and a fifth switch, one end thereof being connected to the power supply, and the other end thereof being connected to the other end of the first transformer capacitor and the first switch of the single excitation circuit.

A fifth aspect of the present disclosure is the above detection head, in which the driving capacitor and the first transformer capacitor are charged by turning on the first, third, and fifth switches, and turning off the second and fourth switches, a voltage generated by adding a voltage due to electric charge charged in the driving capacitor and a voltage due to electric charge charged in the first transformer capacitor is applied to the driving capacitor by turning on the first, and fourth switches, and turning off the second, third, and fifth switches, and the transmission coil generates the alternate-current magnetic field by turning on the second switch while turning off the first switch.

A sixth aspect of the present disclosure is the above detection head, in which the first transformer capacitor is charged by turning on the third and fifth switches, and turning off the first, second, and fourth switches, the driving capacitor is charged by moving a part of the electric charge charged in the first transformer capacitor to the driving capacitor by turning on the first switch, and turning off the second to fifth switches, and the transmission coil generates the alternate-current magnetic field by turning on the second switch while turning off the first switch.

A seventh aspect of the present disclosure is the above detection head, in which the switched capacitor circuit includes: a second transformer capacitor; a third switch, one end thereof being connected to the ground; a fourth switch, one end thereof being connected to the other end of the third switch and one end of the second transformer capacitor, and the other end thereof being connected to the power supply; a fifth switch, one end thereof being connected to the power supply; and a sixth switch, one end thereof being connected to the other end the fifth switch and the other end of the second transformer capacitor, and the other end thereof being connected to the first switch of the single excitation circuit.

A eighth aspect of the present disclosure is the above detection head, in which the driving capacitor is charged by performing a charging cycle including a first step and a second step one or more times, in the first step, the first and second transformer capacitors are charged by turning on the third, fifth, and sixth switches and turning off the first, second, and fourth switches, in the second step, a voltage stepped up above the power supply voltage by moving the electric charge charged in the first transformer capacitor to the driving capacitor and the first transformer capacitor by turning on the first, fourth, and sixth switches and turning off the second, third, and fifth switches, and the transmission coil generates the alternate-current magnetic field by turning on the second switch while turning off the first switch.

A ninth aspect of the present disclosure is the above detection head, in which the driving capacitor is charged by performing a charging cycle including a first step and a second step one or more times, in the first step, the first transformer capacitor is charged by turning on the second, third, and fifth switches and turning off the first, fourth, and sixth switches, in the second step, the second transformer capacitor and the driving capacitor are charged by moving the electric charge charged in the first transformer capacitor to the second transformer capacitor and the driving capacitor by turning on the first, third, and sixth switches and turning off the second, fourth, and fifth switches, and the transmission coil generates the alternate-current magnetic field by turning on the second switch while turning off the first switch.

A tenth aspect of the present disclosure is the above detection head, in which the voltage adjustment circuit includes: a seventh switch, one end thereof being connected between the first switch and the second switch of the single excitation circuit; and an eighth switch connected in parallel to the first transformer capacitor, one end thereof being connected to the seventh switch and the other end thereof being connected to the ground, the driving capacitor of the single excitation circuit is charged and the first transformer capacitor is discharged by turning on the eighth switch and the first switch of the single excitation circuit and turning off the seventh switch and the second switch of the single excitation circuit, a part of the electric charge charged in the driving capacitor of the single excitation circuit is moved to the first transformer capacitor by turning on the seventh switch, and turning off the eighth switch, and the first and second switches of the single excitation circuit, and the transmission coil generates the alternate-current magnetic field by turning on the second switch of the single excitation circuit, and the seventh switch, the eighth switch, and the first switch of the single excitation circuit.

A eleventh aspect of the present disclosure is the above detection head, in which the voltage adjustment circuit includes two or more of the seventh switches connected in parallel, the two or more of the seventh switches are connected to the first switches of two or more of the excitation circuits, respectively, and by selectively turning on/off any one of the two or more of the seventh switches, the single excitation circuit corresponding to the seventh switch selectively turned on/off.

A twelfth aspect of the present disclosure is the above detection head, in which the voltage adjustment circuit includes a ninth switch, one end thereof being connected between the power supply outputting the power supply voltage and the first switch of the connected excitation circuit, one end of the first transformer capacitor is connected to the ninth switch and the other end thereof is connected to the ground, the first transformer capacitor is charged by turning on the ninth switch and turning off the first and second switches of the single excitation circuit, the electric charge charged in the first transformer capacitor is moved to the driving capacitor of the single excitation circuit by turning on the first switch of the single excitation circuit, and turning off the ninth switch and the second switch of the single excitation circuit, and the transmission coil generates the alternate-current magnetic field by turning on the second switch of the single excitation circuit, and the ninth switch and the first switch of the single excitation circuit.

A thirteenth aspect of the present disclosure is the above detection head, in which the voltage adjustment circuit further includes a tenth switch one end thereof being connected to the ground and the other end thereof being connected between the first switch and the second switch of the single excitation circuit, the driving capacitor is charged by turning on the tenth switch, and turning off the ninth switch, and the first and second switches of the single excitation circuit, and the transmission coil generates the alternate-current magnetic field by turning on the second switch of the single excitation circuit, and the ninth and tenth switches, and the first switch of the single excitation circuit.

A fourteenth aspect of the present disclosure is the above detection head, in which the ninth switch of the voltage adjustment circuit is connected between the first switches of two or more excitation circuits and the first transformer capacitor, and the single excitation circuit including the first and second switches to be controlled is driven by controlling the ninth switch together with the first and second switches of any one of the two or more excitation circuits.

A fifteenth aspect of the present disclosure is the above detection head, in which two or more voltage adjustment circuit respectively corresponding to the two or more excitation circuits in the plurality of the excitation circuits are disposed.

A sixteenth aspect of the present disclosure is an encoder including a scale including a plurality of scale tracks, scale coils are disposed in each scale track; a detection head configured to induce currents in the scale coils disposed in the scale tracks and to detect an alternate-current magnetic field inducing currents generated by the induced currents; and a signal processing unit configured to a displacement of the scale based on a detection result, in which the detection head of an encoder includes: a plurality of excitation circuits respectively including a resonant circuit that includes a driving capacitor and a transmission coil connected in series and configured to generate the alternate-current magnetic field inducing currents in the scale coils disposed in the scale tracks on the scale by connecting both ends of the resonant circuit in a state in which the driving capacitor is charged; and a voltage adjustment circuit including a first transformer capacitor and configured to control a charging voltage of the driving capacitor in a single excitation circuit using the charged first transformer capacitor.

According to the present disclosure, it is possible to respectively excite transmission coils with different voltages using a single power supply with low power consumption in an electromagnetic induction type encoder.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
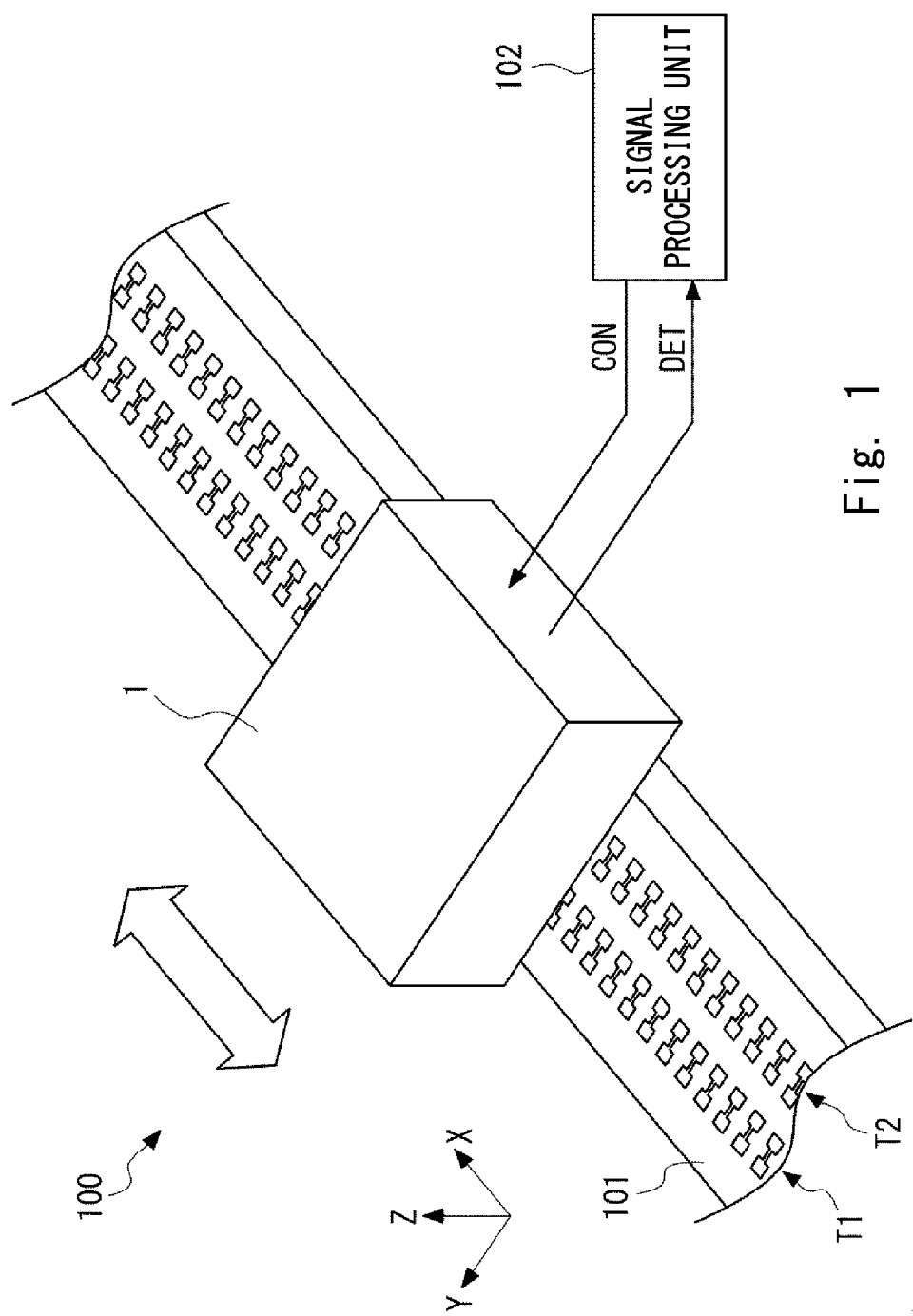
FIG. 1 schematically illustrates a configuration of an absolute encoder according to a first exemplary embodiment.

Hereinafter, embodiments of the present disclosure will be described with reference to the drawings. In the drawings, the same elements are denoted by the same reference signs, and repeated descriptions will be omitted as necessary.

First Exemplary Embodiment

An electromagnetic induction type absolute encoder according to a first exemplary embodiment will be described below. FIG. 1 schematically illustrates a configuration of an absolute encoder 100 according to the first exemplary embodiment. The encoder 100 includes a detection head 1, a scale 101, and a signal processing unit 102. The scale 101 and the detection head 1 are configured to be relatively movable in a displacement measurement direction. Hereinbelow, the measurement direction is an X-direction. A principal surface of each of the scale 101 and the detection head 1 is an X-Y plane parallel to the X-direction and a Y-direction orthogonal to the X-direction, and the scale 101 and the detection head 1 are separately arranged in a Z-direction orthogonal to the X-direction and the Y-direction. An operation of each part of the detection head 1 is controlled in response to a control signal CON output from the signal processing unit 102, for example. A detection result of the detection head 1 is output to the signal processing unit 102 by a detection signal DET.

Figure 2:
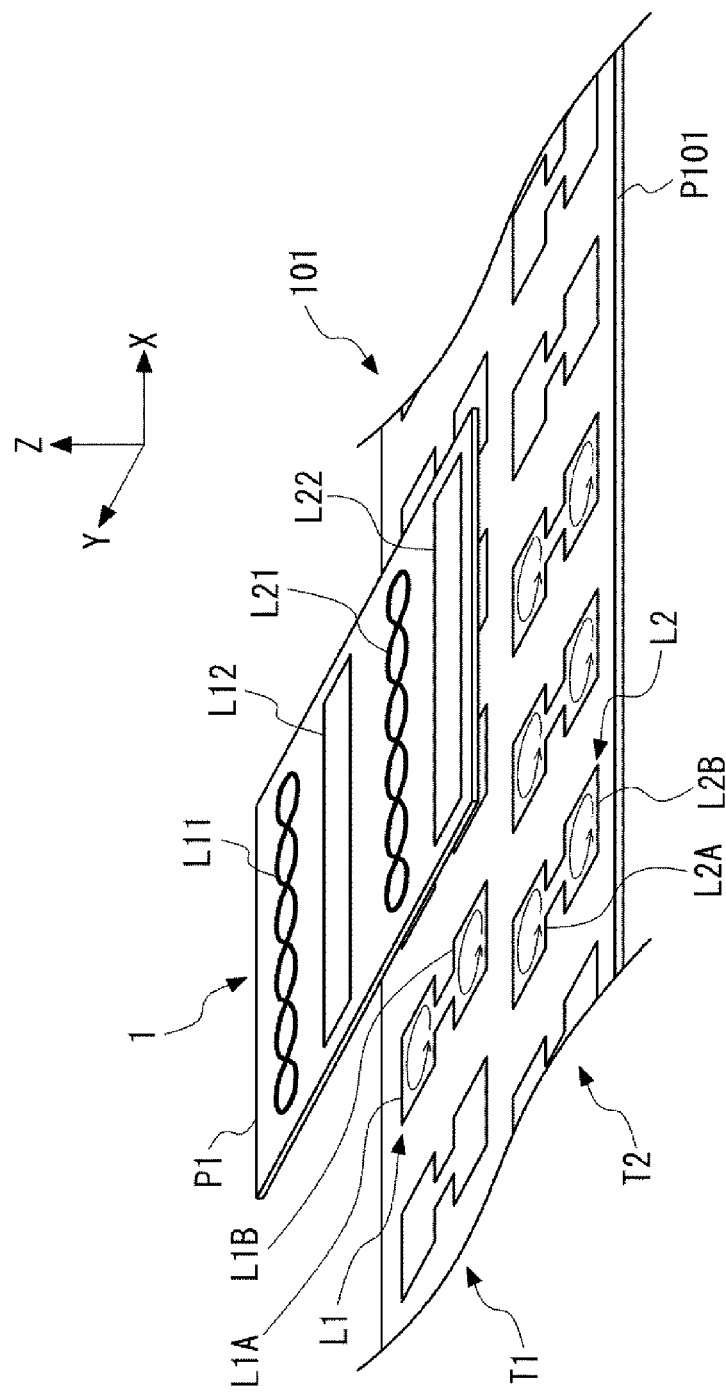
FIG. 2 illustrates configurations of a scale and a detection head.

FIG. 2 illustrates configurations of the scale 101 and the detection head 1. The scale 101 whose principal surface is the X-Y plane includes a plate-like member P101 whose longitudinal direction is the X-direction. Scale tracks T1 and T2 extending to the X-direction are arranged in the Y-direction on the plate-like member P101. Scale coils L1 are periodically arranged in the X-direction on the scale track T1. Scale coils L2 are periodically arranged in the X-direction on the scale track T2. In this example, the scale coils L1 and the scale coils L2 are disposed with different periods in the X-direction.

The detection head 1 includes a plate-like member P1 whose principal surface is the X-Y plane. In FIG. 2, for simplifying the drawing, only a transmission coil L11 and a reception coil L12 corresponding to the scale track T1, and a transmission coil L21 and a reception coil L22 corresponding to the scale track T2 disposed on the plate-like member P1 are illustrated.

The transmission coil L11 and the reception coil L12 are arranged to overlap with the scale track T1 in the Z-direction. An AC (Alternative-Current) signal is provided to the transmission coil L11, for example, from an excitation circuit, and thereby an induced magnetic field is generated. An induction current generated in a coil L1A of the scale coil L1 by the induced magnetic field generated in the transmission coil L11. As a result, an induction current also flows in a coil L1B paired with the coil L1A. An induced magnetic field is generated by the induction current flowing in the coil L1B, and an induction current is generated in the reception coil L12 by the induced magnetic field. The induction current flowing in the reception coil L12 is transmitted to the signal processing unit 102 as a detection signal of the scale coil L1 (e.g. Detection signal DET in FIG. 1).

Similarly, the transmission coil L21 and the reception coil L22 are arranged to overlap with the scale track T2 in the Z-direction. An AC (Alternative-Current) signal is provided to the transmission coil L21, for example, from the signal processing unit 102, and thereby an induced magnetic field is generated. An induction current generated in a coil L2A of the scale coil L2 by the induced magnetic field generated in the transmission coil L21. As a result, an induction current also flows in a coil L2B paired with the coil L2A. An induced magnetic field is generated by the induction current flowing in the coil L2B, and an induction current is generated in the reception coil L22 by the induced magnetic field. The induction current flowing in the reception coil L22 is transmitted to the signal processing unit 102 as a detection signal of the scale coil L2 (e.g. Detection signal DET in FIG. 1).

Figure 3:
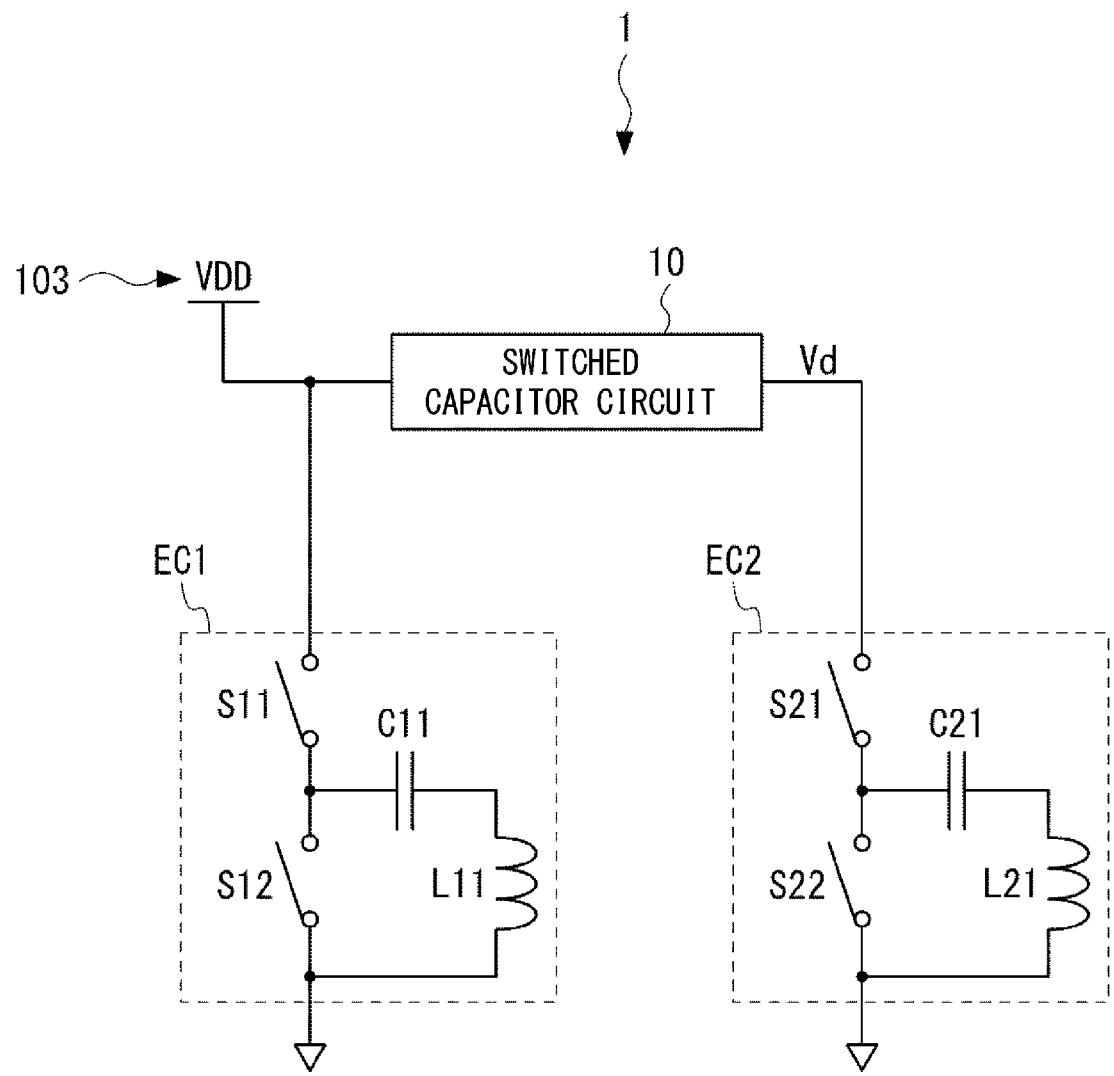
FIG. 3 schematically illustrates a configuration of the detection head according to the first exemplary embodiment.

Next, the detection head 1 according to the present exemplary embodiment will be described in more detail. FIG. 3 schematically illustrates the configuration of the detection head 1 according to the first exemplary embodiment. The detection head 1 includes a switched capacitor circuit 10, an excitation circuit EC1, and an excitation circuit EC2. The detection head 1 is supplied with a power supply voltage VDD from a power supply 103.

The excitation circuit EC1 is connected between the power supply 103 and a ground. The switched capacitor circuit 10 is connected between the power supply 103 and the excitation circuit EC2, and drives the excitation circuit EC2 with a voltage generated by stepping up or stepping down the power supply voltage VDD. The excitation circuit EC2 is inserted between an output of the switched capacitor circuit 10 and the ground.

Hereinbelow, "turning on a switch" means closing the switch to make an electrically connected state, and "turning off a switch" means opening the switch to make an electrically open state.

The excitation circuit EC1 includes switches S11 and S12, a driving capacitor C11, and the transmission coil L11. The switches S11 and S12 are connected in series in this order between the switched capacitor circuit 10 and the ground. The driving capacitor C11 and the transmission coil L11 are connected in series in this order between a node between the switch S11 (also referred to as a first switch) and the switch S12 (also referred to as a second switch), and the ground.

In the excitation circuit EC1, the driving capacitor C11 is charged by a voltage applied through the switch S11 by turning on the switch S11 and the turning off the switch S12. After that, an LC resonant circuit is formed by the driving capacitor C11 and the transmission coil L11 by turning off the switch S11 and the turning on the switch S12. As a result, the AC signal generated by the resonance flows in the transmission coil L11 and thereby an alternative magnetic field is generated.

The excitation circuit EC2 has the same configuration as the excitation circuit EC1. Note that, in the excitation circuit EC2, a driving voltage is supplied to the switched capacitor circuit 10. That is, a switch S21 (First switch), a switch S22 (Second switch) in the excitation circuit EC2, a driving capacitor C21, and the transmission coil L21 correspond to the switch S11, the switch S12, the driving capacitor C11, and the transmission coil L11, respectively.

Thus, in the excitation circuit EC2, the driving capacitor C21 is charged by a voltage applied through the switch S21 by turning on the switch S21 and the turning off the switch S22. After that, an LC resonant circuit is formed by the driving capacitor C21 and the transmission coil L21 by turning off the switch S21 and the turning on the switch S22. As a result, the AC signal generated by the resonance flows in the transmission coil L21 and thereby an alternative magnetic field is generated.

Note that operations of the excitation circuits EC1 and EC2 such as turning on and turning off the switches are controlled, for example, by the signal processing unit 102.

The switched capacitor circuit 10 is configured as a voltage adjustment circuit of the excitation circuit. The switched capacitor circuit 10 can be configured as a step-up circuit or a step-down circuit.

Figure 4:
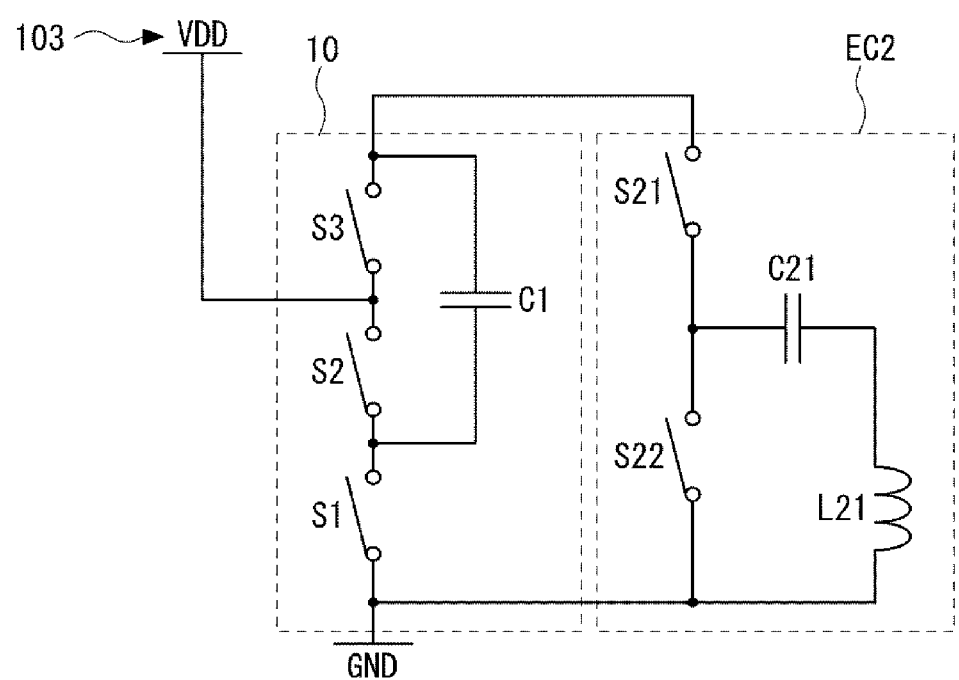
FIG. 4 schematically illustrates a circuit configuration of a switched capacitor circuit according to the first exemplary embodiment.

FIG. 4 schematically illustrates a circuit configuration of the switched capacitor circuit 10. The switched capacitor circuit 10 includes switches S1 to S3, and a transformer capacitor C1. The transformer capacitor C1 (also referred to as a first transformer capacitor) is disposed as a capacitor to control a charging voltage of the driving capacitor C21. One end of the switch S1 (also referred to as a third switch) is connected to the ground and the other end of the switch S1 is connected to one end of the switch S2 (also referred to as a fourth switch). The other end of the switch S2 is connected to the power supply 103. The switch S3 (also referred to as a fifth switch) is connected between the power supply 103 and the switch S21 of the excitation circuit EC2. That is, the switches S1 to S3 are connected in series between the switch S21 of the excitation circuit EC2 and the ground. The transformer capacitor C1 is connected in parallel to the switches S2 and S3 connected in series.

The switched capacitor circuit 10 can function as the step-up circuit or the step-down circuit by control switching of the switches S1 to S3.

Figure 5:
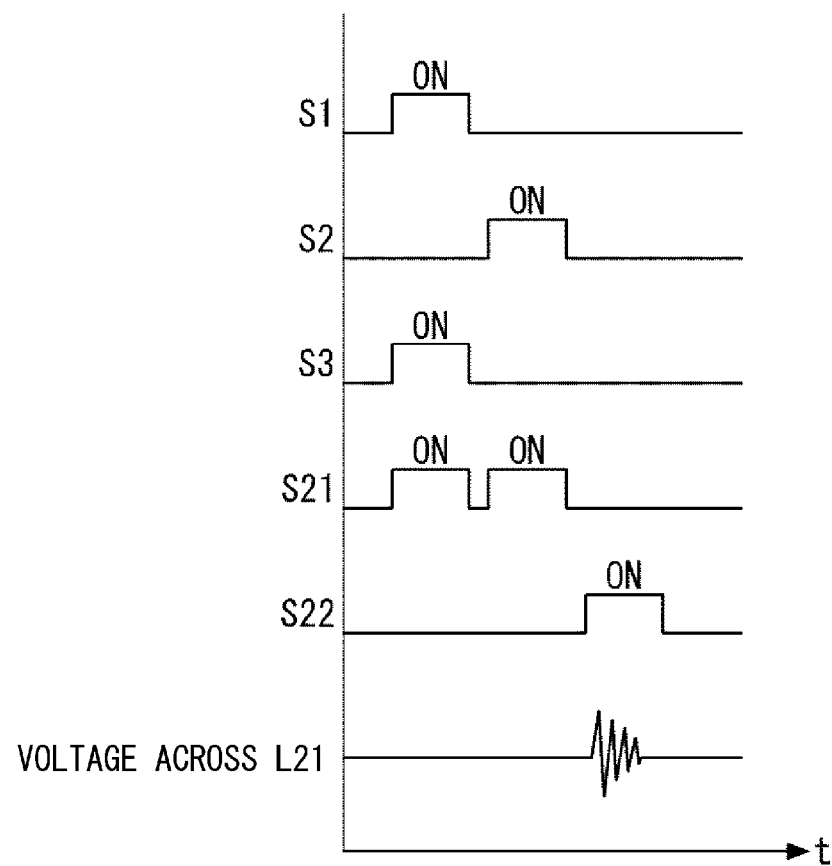
FIG. 5 illustrates switching timings of respective switches when the switched capacitor circuit according to the first exemplary embodiment operates as the step-up circuit.
Figure 6:
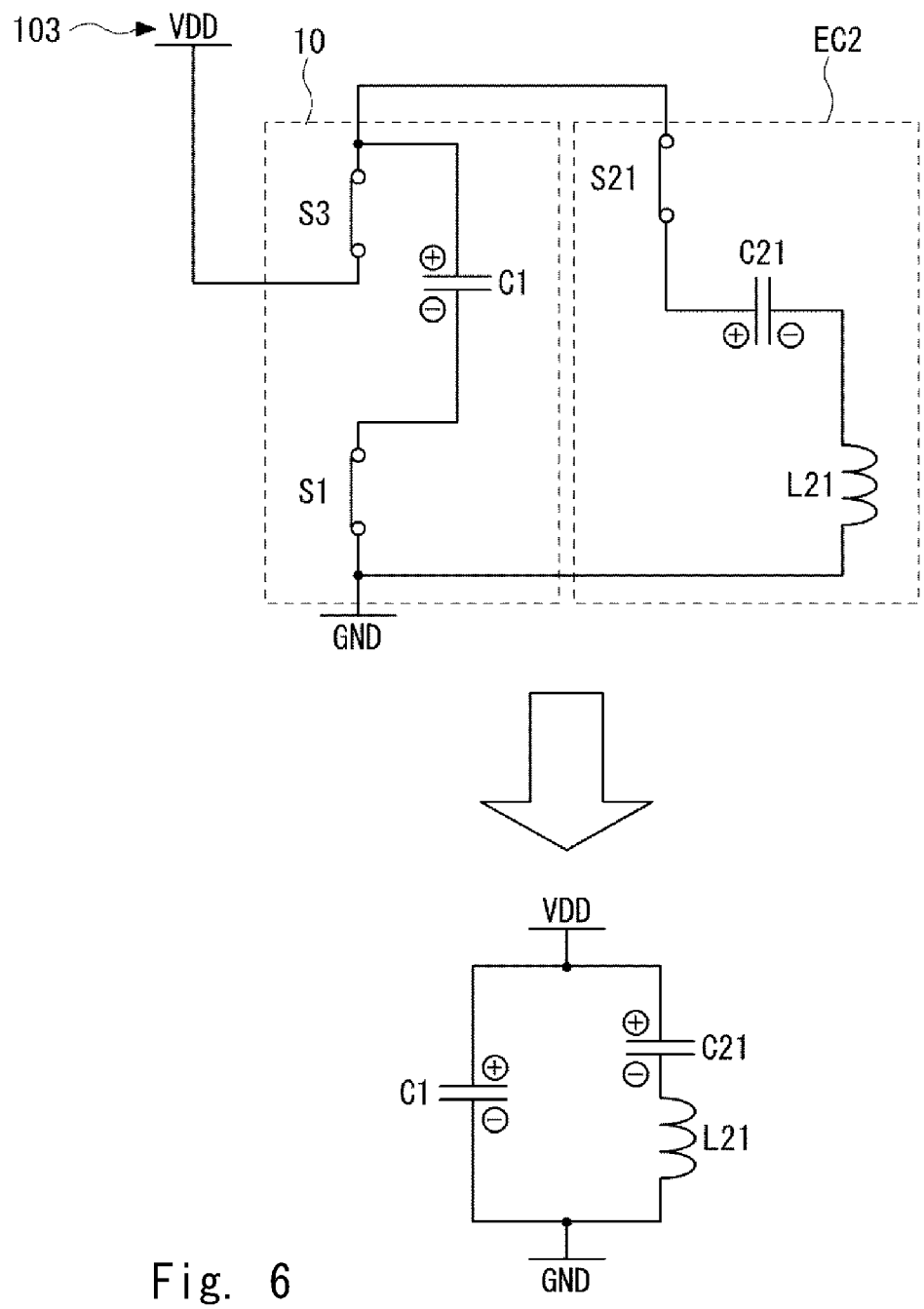
FIG. 6 schematically illustrates an equivalent circuit formed by the switched capacitor circuit and an excitation circuit according to the first exemplary embodiment when switches S1, S3, and S21 are turned on and switches S2 and S22 are turned off.

In a case in which the switched capacitor circuit 10 operates as the step-up circuit will be described. FIG. 5 illustrates switching timings of respective switches when the switched capacitor circuit 10 operates as the step-up circuit First, the switches S1, S3, and S21 are turned on and the switches S2 and S22 are turned off. FIG. 6 schematically illustrates an equivalent circuit formed by the switched capacitor circuit 10 and the excitation circuit EC2 when the switches S1, S3, and S21 are turned on and the switches S2 and S22 are turned off. In this case, between the power supply 103 and the ground, the transformer capacitor C1 is connected in parallel to the driving capacitor C21 and the transmission coil L21 connected in series in the excitation circuit EC2. Thus, the transformer capacitor C1 and the driving capacitor C21 are charged.

Figure 7:
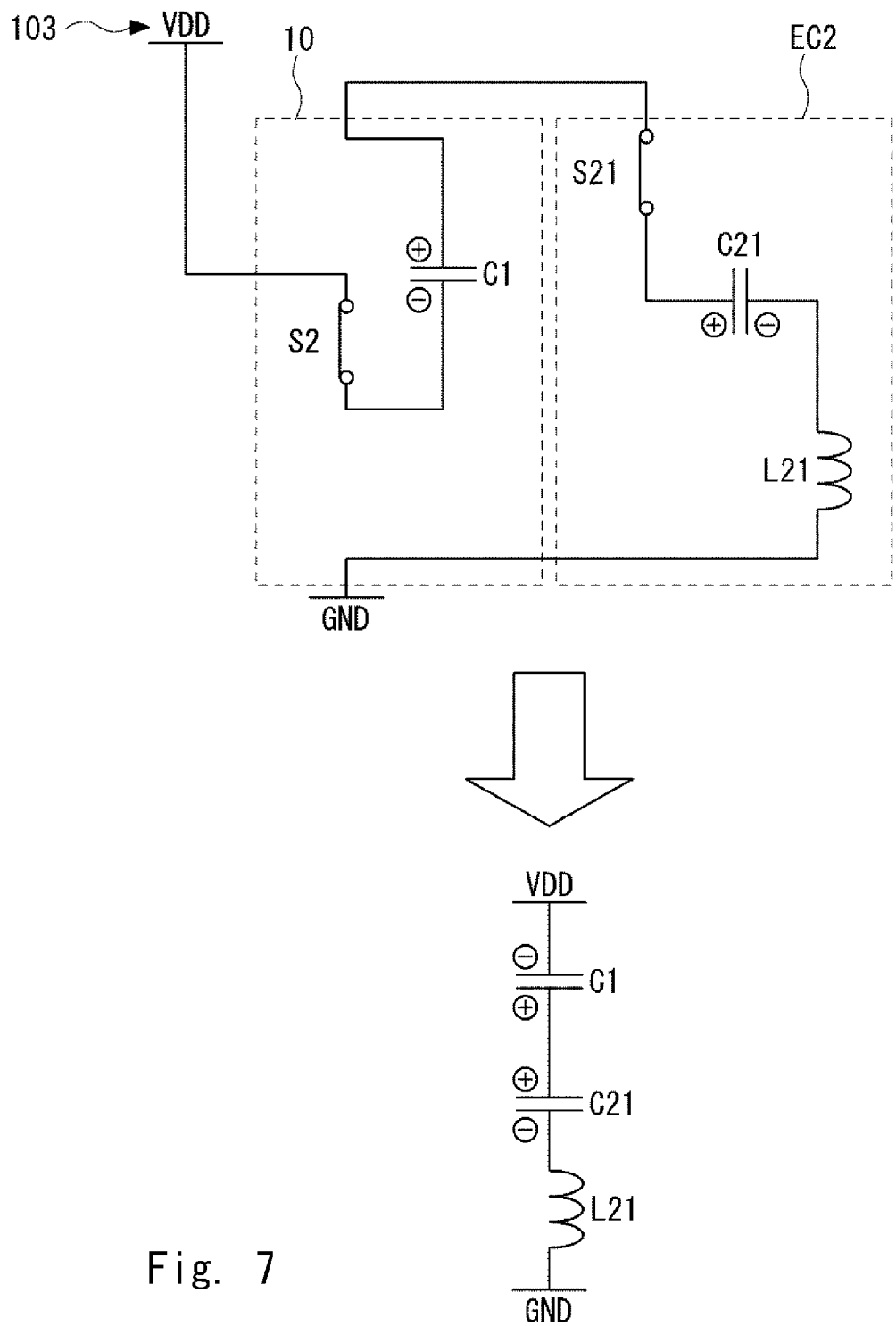
FIG. 7 schematically illustrates an equivalent circuit formed by the switched capacitor circuit and the excitation circuit according to the first exemplary embodiment when the switches S2 and S21 are turned on and the switches S1, S3, and S22 are turned off.

Next, the switches S2 and S21 are turned on and the switches S1, S3, and S22 are turned off. FIG. 7 schematically illustrates an equivalent circuit formed by the switched capacitor circuit 10 and the excitation circuit EC2 when the switches S2 and S21 are turned on and the switches S1, S3, and S22 are turned off. In this case, the transformer capacitor C1, the driving capacitor C21 and the transmission coil L21 are connected in series. Note that the transformer capacitor C1 is connected with the opposite polarity as compared with the case of FIG. 6. That is, a voltage generated by adding a voltage due to the electric charge charged in the transformer capacitor C1 and a voltage due to the electric charge charged in the driving capacitor C21 is applied to the driving capacitor C21. In this case, the voltage V applied to the driving capacitor C21 is expressed by the following expression (1).

$$V = \left(1 + \frac{C1}{C1 + C21}\right) VDD \quad (1)$$

Thus, it can be understood that the driving voltage output from the switched capacitor circuit 10, or the voltage V applied to the driving capacitor C21 is a voltage stepped-up from the power supply voltage VDD. Further, by adjusting a capacitance of the transformer capacitor C1, the voltage V applied to the driving capacitor C21 can be stepped up to 2*VDD.

Afterward, by turning on the switch S22 while turning off the switch S21, the LC resonant circuit is formed by the driving capacitor C21 and the transmission coil L21. As a result, the AC signal generated by the resonance flows in the transmission coil L21 and thereby the alternative magnetic field is generated.

Figure 8:
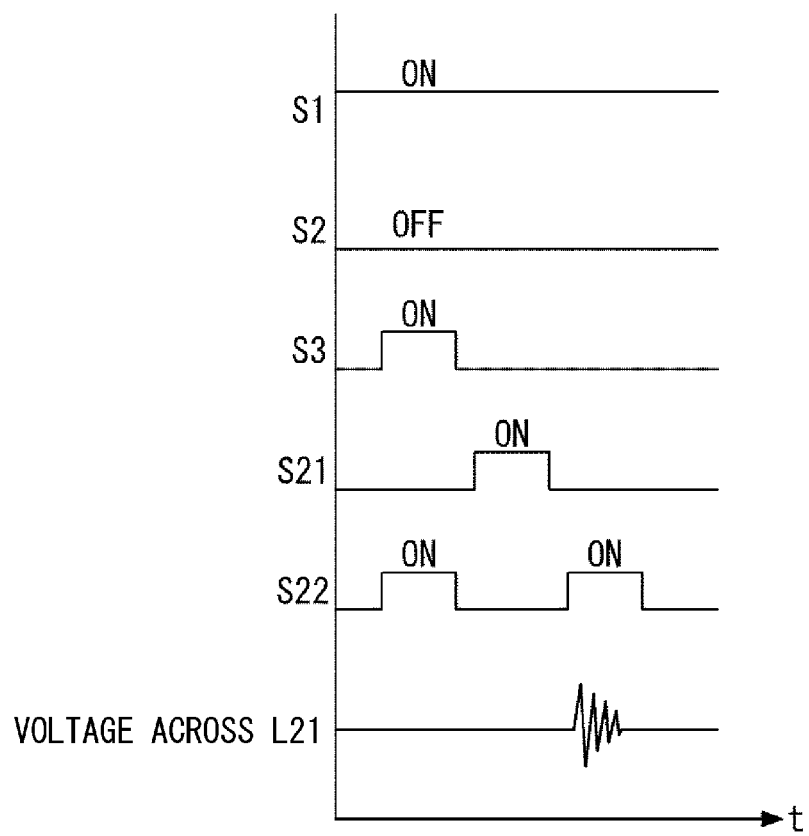
FIG. 8 illustrates switching timings of respective switches when the switched capacitor circuit according to the first exemplary embodiment operates as the step-down circuit.

Next, in a case in which the switched capacitor circuit 10 operates as the step-down circuit will be described. FIG. 8 illustrates switching timings of respective switches when the switched capacitor circuit 10 operates as the step-down circuit. In this case, the switch S1 is constantly on and the switch S2 is constantly off.

Figure 9:
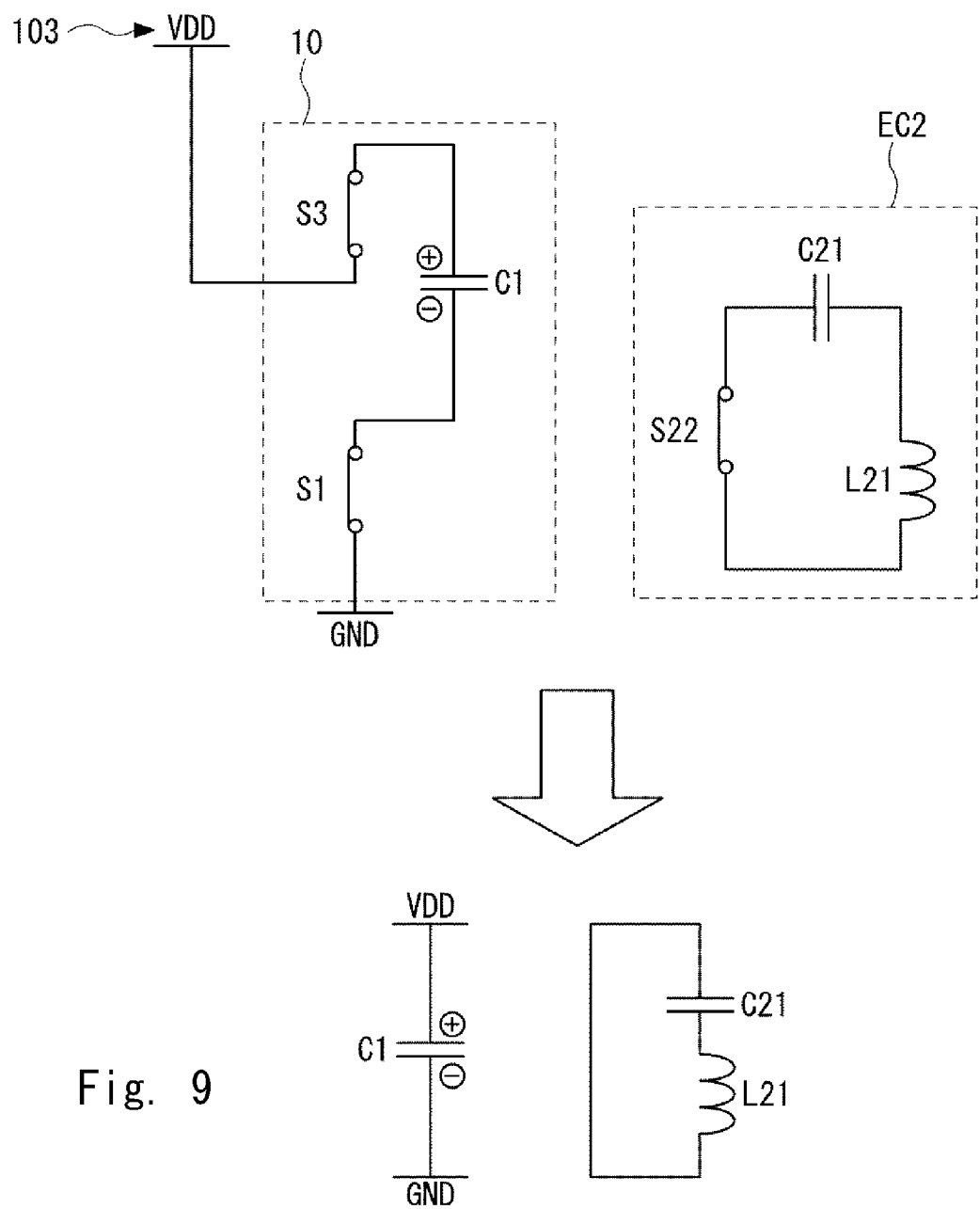
FIG. 9 schematically illustrates an equivalent circuit formed by the switched capacitor circuit and the excitation circuit according to the first exemplary embodiment when the switches S1, S3, and S22 are turned on and the switches S2 and S21 are turned off.

First, the switches S1, S3, and S22 are turned on and the switches S2 and S21 are turned off. FIG. 9 schematically illustrates an equivalent circuit formed by the switched capacitor circuit 10 and the excitation circuit EC2 when the switches S1, S3, and S22 are turned on and the switches S2 and S21 are turned off. In this case, the transformer capacitor C1 is connected between the power supply 103 and the ground, and thereby the transformer capacitor C1 is charged by the power supply voltage VDD. Since both ends of the driving capacitor C21 are short-circuited, the electric charge charged in the driving capacitor C21 is discharged.

Figure 10:
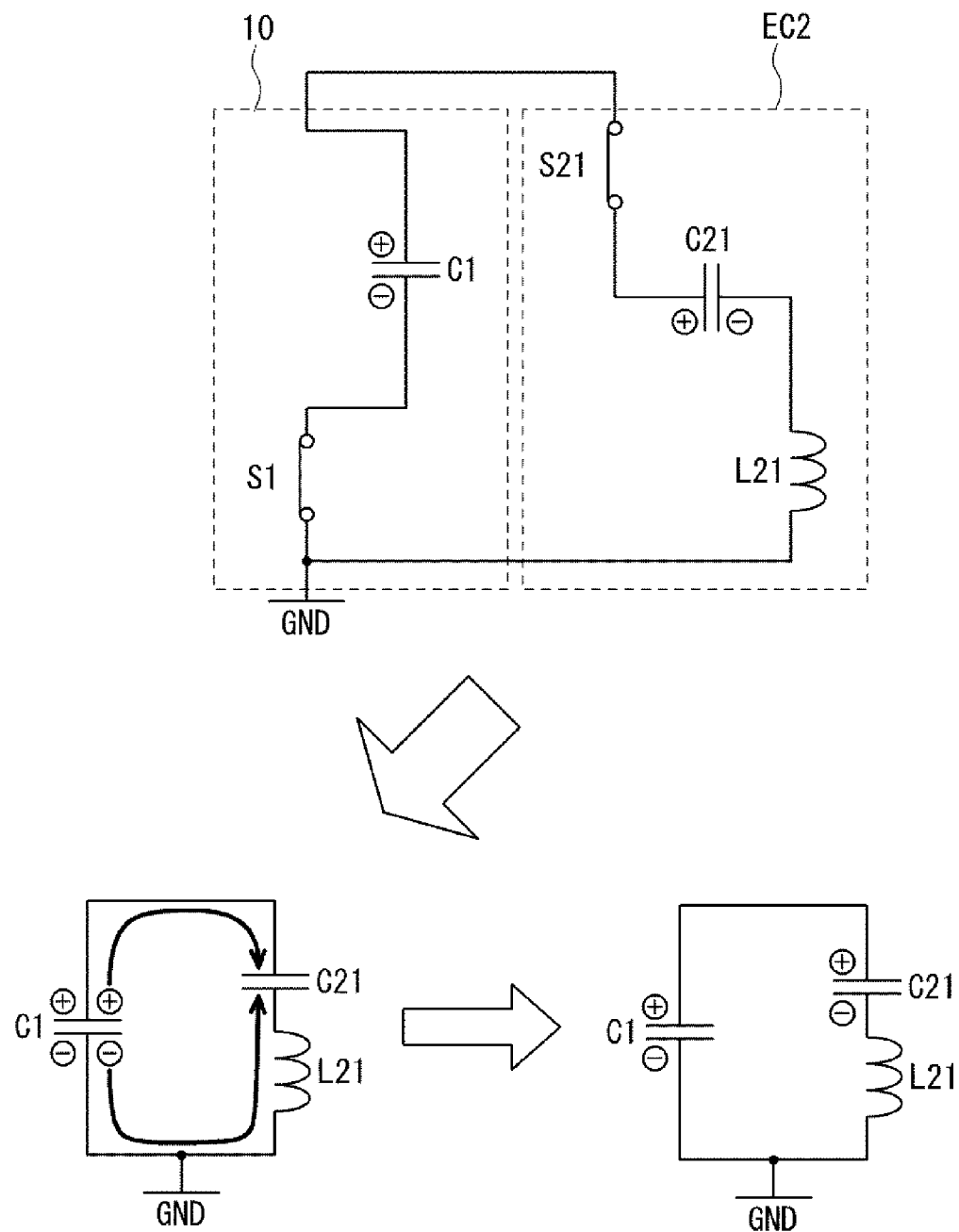
FIG. 10 schematically illustrates an equivalent circuit formed by the switched capacitor circuit and the excitation circuit according to the first exemplary embodiment when the switches S1 and S21 are turned on and the switches S2, S3, and S22 are turned off.

Next, the switches S1 and S21 are turned on and the switches S2, S3, and S22 are turned off. FIG. 10 schematically illustrates an equivalent circuit formed by the switched capacitor circuit 10 and the excitation circuit EC2 when the switches S1 and S21 are turned on and the switches S2, S3, and S22 are turned off. In FIG. 10, the electric charges just after the switching are schematically illustrated in the upper and lower-left circuit diagrams, and the electric charges after being moved by the switching are schematically illustrated in the lower-right circuit diagram. Note that the lower circuit diagrams in FIG. 10 are for facilitating the understanding of the movement of the electric charges, it should be appreciated that the number of the illustrated electric charges is only schematic. In this case, a part of the electric charge charged in the transformer capacitor C1 is moved to the driving capacitor C21. The voltage V applied to the driving capacitor C21 in this case is expressed by the following expression (2).

$$V = \left(\frac{C1}{C1 + C21}\right) VDD \quad (2)$$

Thus, it can be understood that the driving voltage output from the switched capacitor circuit 10, or the voltage V applied to the driving capacitor C21 is a voltage stepped-down from the power supply voltage VDD.

Afterward, by turning on the switch S22 while turning off the switch S21, the LC resonant circuit is formed by the driving capacitor C21 and the transmission coil L21. As a result, the AC signal generated by the resonance flows in the transmission coil L21 and thereby the alternative magnetic field is generated.

Note that operations of the switched capacitor circuit 10 such as turning on and turning off the switches described above are controlled, for example, by the signal processing unit 102.

Although the configuration in which the switched capacitor circuit 10 applies the driving voltage to the excitation circuit EC2 has been described in the above, it is merely an example. For example, a switched capacitor circuit having the same configuration as the switched capacitor circuit 10 may be further disposed to apply a driving voltage to the excitation circuit EC1.

As described above, according to the present configuration, power consumption in the switched capacitor circuit 10 can be suppressed and it is possible to apply supply to one excitation circuit with the voltage stepped up or stepped down from the power supply voltage output from the single power-saving power supply. Thus, it is possible to cause strength of the signal received by the reception coil to be a desired value for each scale track.

Second Exemplary Embodiment

Figure 11:
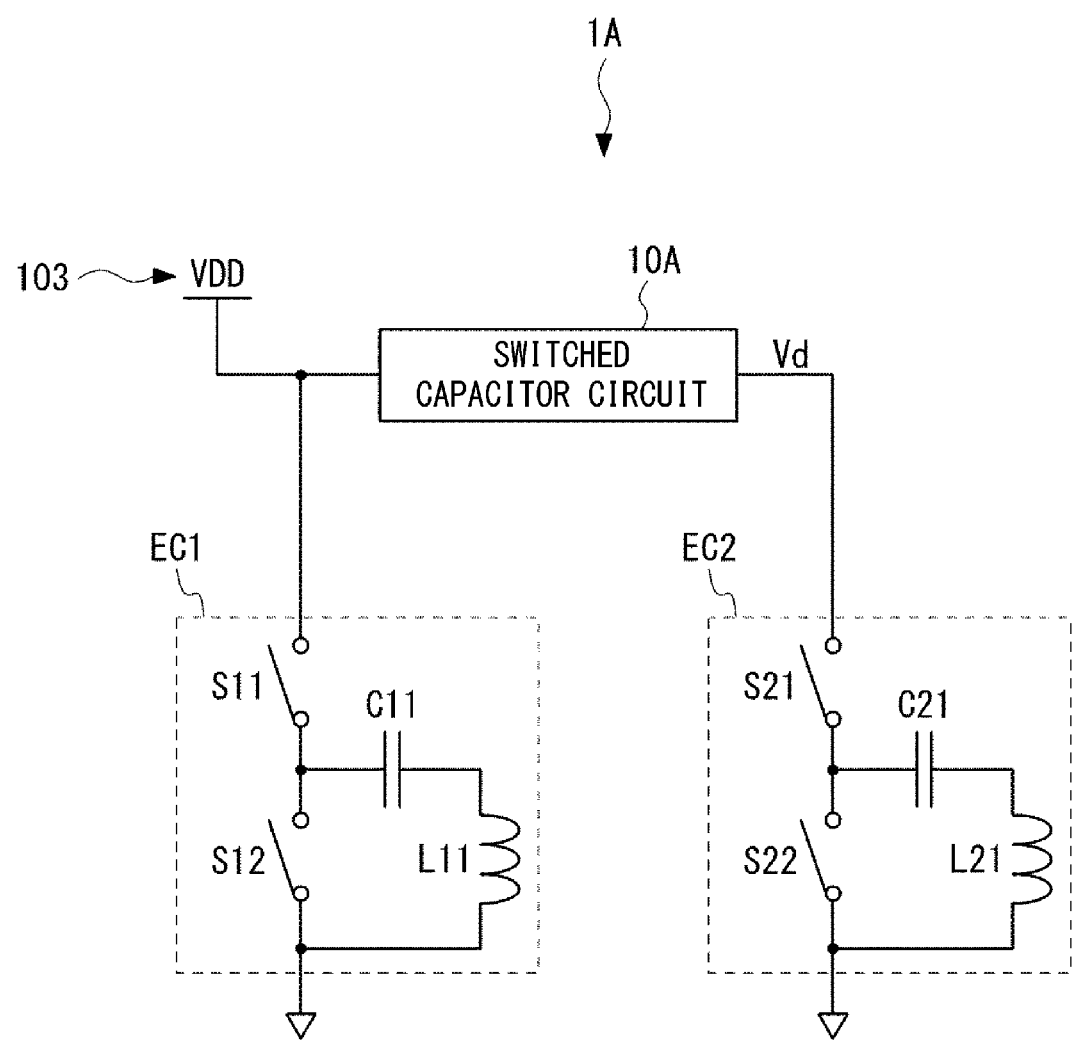
FIG. 11 schematically illustrates a configuration of a main part of a detection head of an encoder according to a second exemplary embodiment.

An electromagnetic induction type absolute encoder according to a second exemplary embodiment will be described below. The encoder according to the present exemplary embodiment is configured to provide a driving voltage whose voltage value is controlled by continuously performing voltage transformation by the switched capacitor. FIG. 11 schematically illustrates a configuration of a main part of a detection head 1A of an encoder according to the second exemplary embodiment. The detection head 1A has a configuration in which the switched capacitor circuit 10 in the detection head 1 is replaced with a switched capacitor circuit 10A.

Figure 12:
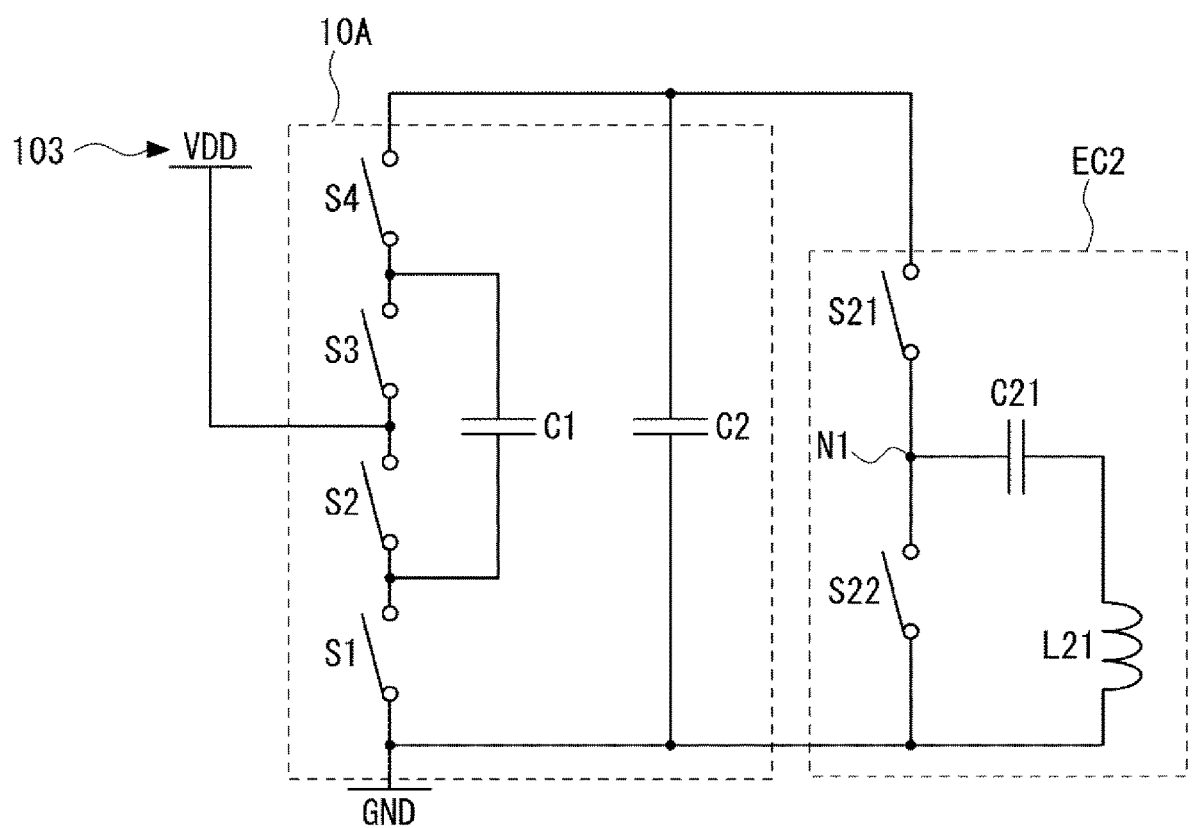
FIG. 12 schematically illustrates a circuit configuration of a switched capacitor circuit according to the second exemplary embodiment.

FIG. 12 schematically illustrates a circuit configuration of the switched capacitor circuit 10A. The switched capacitor circuit 10A has a configuration in which a switch S4 and a transformer capacitor C2 (also referred to as second transformer capacitor) are added to the switched capacitor circuit 10 according to the first exemplary embodiment. The switch S4 (also referred to as a sixth switch) is inserted between the switch S3 and the switch S21 of the excitation circuit EC2. The transformer capacitor C2 is inserted between the ground and the end of the switch S4 on the side of the excitation circuit EC2.

Next, an operation of the encoder according to the second exemplary embodiment will be described. As in the case of the switched capacitor circuit 10 according to the first exemplary embodiment, the switched capacitor circuit 10A can function as both the step-up circuit and the step-down circuit by controlling the switching of the switches S1 to S4.

Figure 13:
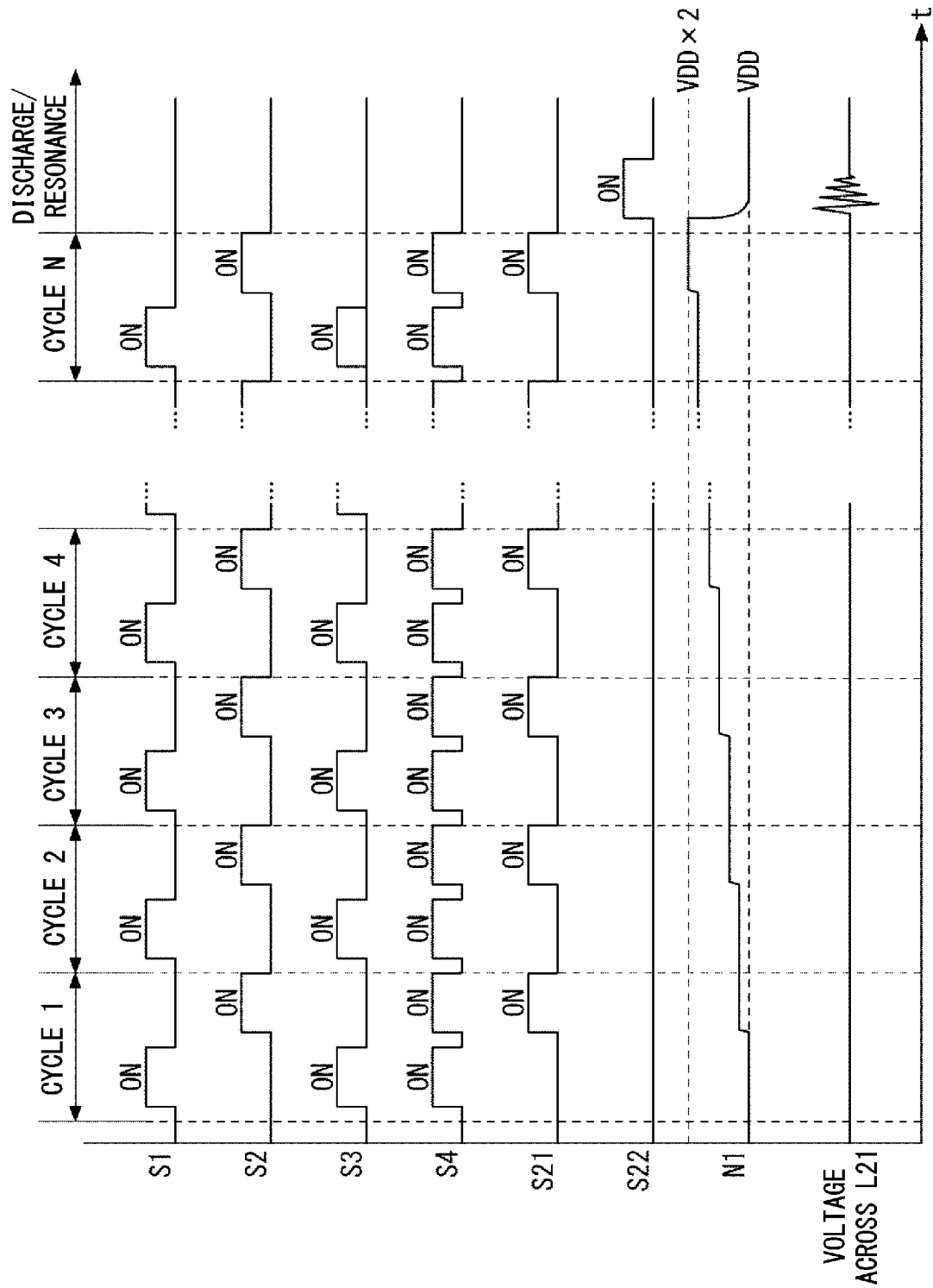
FIG. 13 illustrates a switching timing of respective switches when the switched capacitor circuit according to the second exemplary embodiment operates as the step-up circuit.

First, a case in which the switched capacitor circuit 10A operates as the step-up circuit will be described. FIG. 13 illustrates switching timings of respective switches when the switched capacitor circuit 10A operates as the step-up circuit. In the encoder according to the second exemplary embodiment, the continuously stepped-up driving voltage can be applied to the excitation circuit EC2 by repeating the charging cycle a plurality of times.

Figure 14:
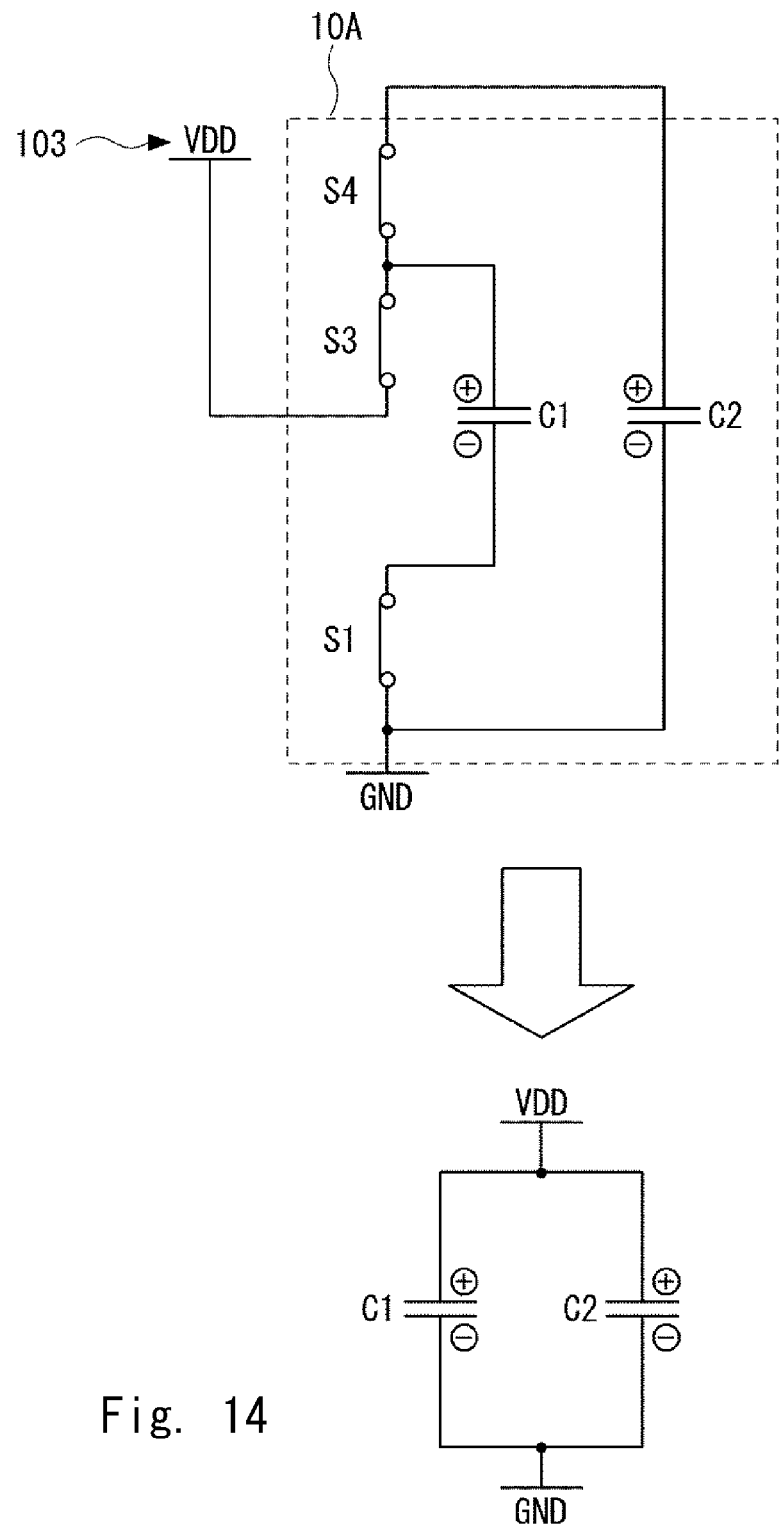
FIG. 14 schematically illustrates an equivalent circuit formed by the switched capacitor circuit and an excitation circuit according to the second exemplary embodiment when switches S1, S3, and S4 are turned on and switches S2, S21, and S22 are turned off.

The charging operation in each charging cycle will be described below. First, the switches S1, S3, and S4 are turned on, and the switches S2, S21, and S22 are turned off. FIG. 14 schematically illustrates an equivalent circuit formed by the switched capacitor circuit 10A and the excitation circuit EC2 when the switches S1, S3, and S4 are turned on and the switches S2, S21, and S22 are turned off. In this case, the transformer capacitor C1 and the transformer capacitor C2 are connected in parallel between the power supply 103 and the ground. Thus, the transformer capacitors C1 and C2 are charged.

Figure 15:
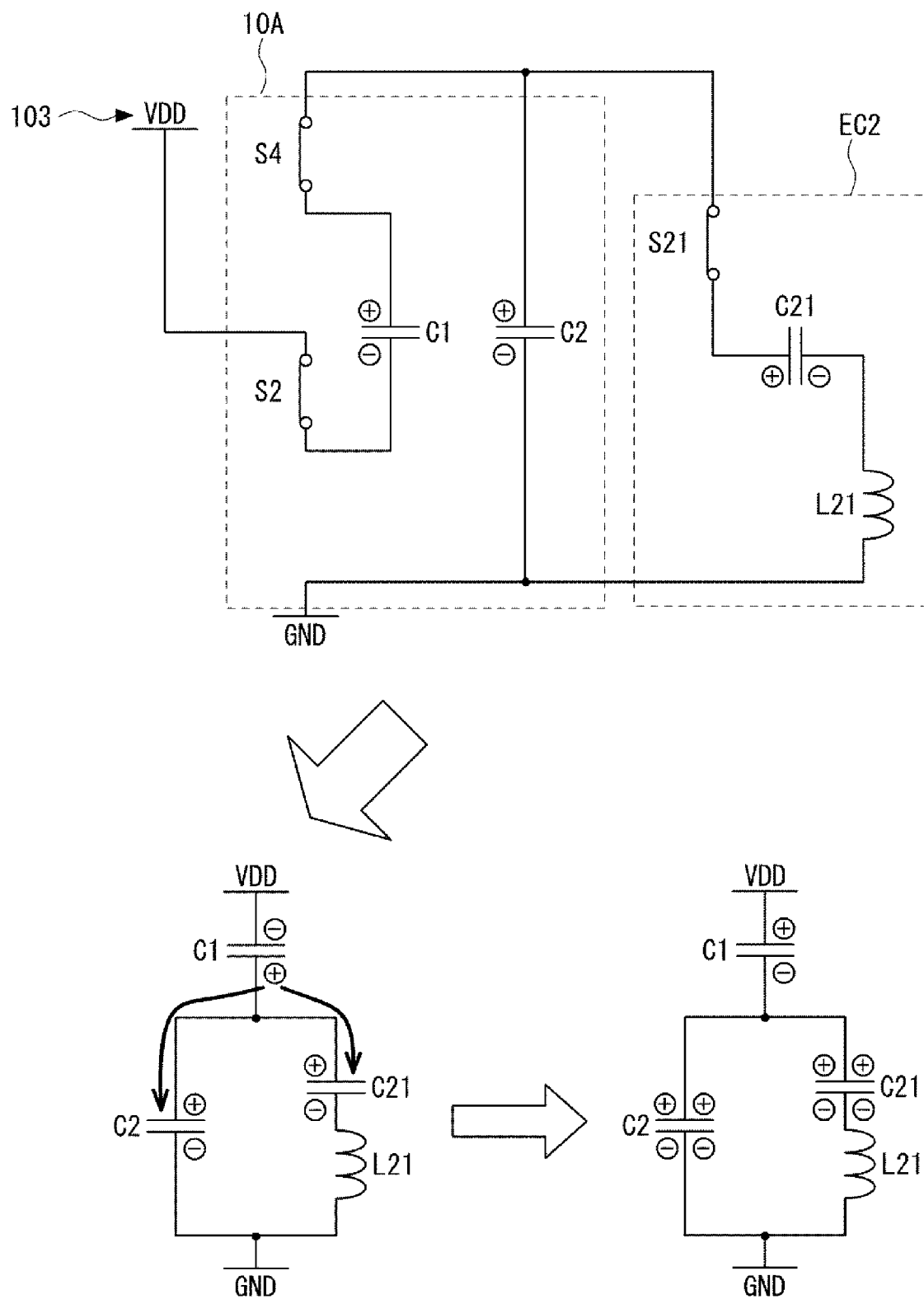
FIG. 15 schematically illustrates an equivalent circuit formed by the switched capacitor circuit and the excitation circuit according to the second exemplary embodiment when the switches S2, S4 and S21 are turned on and the switches S1, S3 and S22 are turned off.

Then, the switches S2, S4 and S21 are turned on, and the switches S1, S3 and S22 are turned off. FIG. 15 schematically illustrates an equivalent circuit formed by the switched capacitor circuit 10A and the excitation circuit EC2 when the switches S2, S4 and S21 are turned on and the switches S1, S3 and S22 are turned off. In FIG. 15, the electric charges just after switching are schematically illustrated in the upper and lower-left circuit diagrams, and the electric charges after moving by switching are schematically illustrated in the lower-right circuit diagram. It should be appreciated that the circuit diagrams in the lower part of FIG. 15 are for facilitating understanding of charge transfer, and the displayed number of charges is only schematic. In this case, the transformer capacitor C2, the driving capacitor C21 and the transmission coil L21 are connected in parallel. The charged transformer capacitor C1 is inserted into the transformer capacitor C2, the driving capacitor C21, and the high voltage side of the transmission coil L21 with opposite polarity. As a result, the electric charge moves from the transformer capacitor C1 to the transformer capacitor C2 and the driving capacitor C21, and the voltage (charging voltage) applied to the transformer capacitor C1 and the driving capacitor C21 at a node N1 illustrated in FIG. 12, that is, the voltage at the node N1 illustrated in FIG. 12, rises.

Thus, it can be understood that by performing a charging cycle including two switching steps only once, the driving voltage output from the switched capacitor circuit 10A, that is, the voltage V applied to the driving capacitor C21 becomes a voltage stepped-up higher than the power supply voltage VDD.

As illustrated in FIG. 13, by repeating the charging cycle a plurality of times, the voltage V applied to the driving capacitor C21 can be continuously and stepwise increased. In the present configuration, by repeating the charging cycle a sufficient number of times (In FIG. 3, N times), the voltage V applied to the driving capacitor C21 can be stepped-up to 2*VDD.

Afterward, by turning on the switch S22 while turning off the switch S21, the LC resonant circuit is formed by the driving capacitor C21 and the transmission coil L21. As a result, the AC signal generated by the resonance flows in the transmission coil L21 and thereby the alternative magnetic field is generated.

Next, in a case in which the switched capacitor circuit 10A operates as the step-down circuit will be described. In this case, the switched capacitor circuit 10A can apply a driving voltage stepped down to an appropriate value to the excitation circuit EC2 by repeating the charging cycle a plurality of times.

Figure 16:
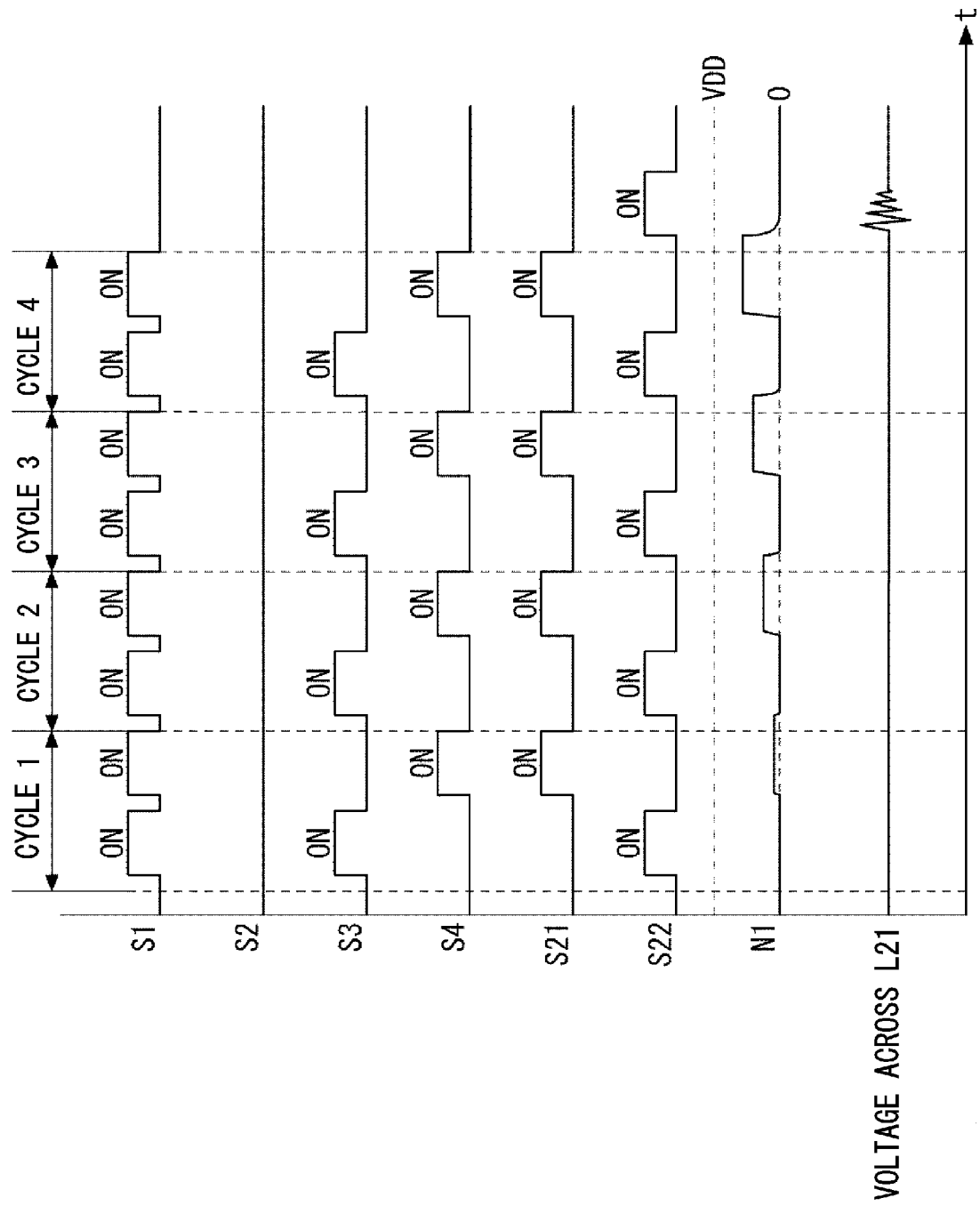
FIG. 16 illustrates switching timings of respective switches when the switched capacitor circuit according to the second exemplary embodiment operates as the step-down circuit.

FIG. 16 illustrates switching timings of respective switches when the switched capacitor circuit 10A operates as the step-down circuit. As illustrated in FIG. 16, the switch S1 is constantly on and the switch S2 is constantly off.

Figure 17:
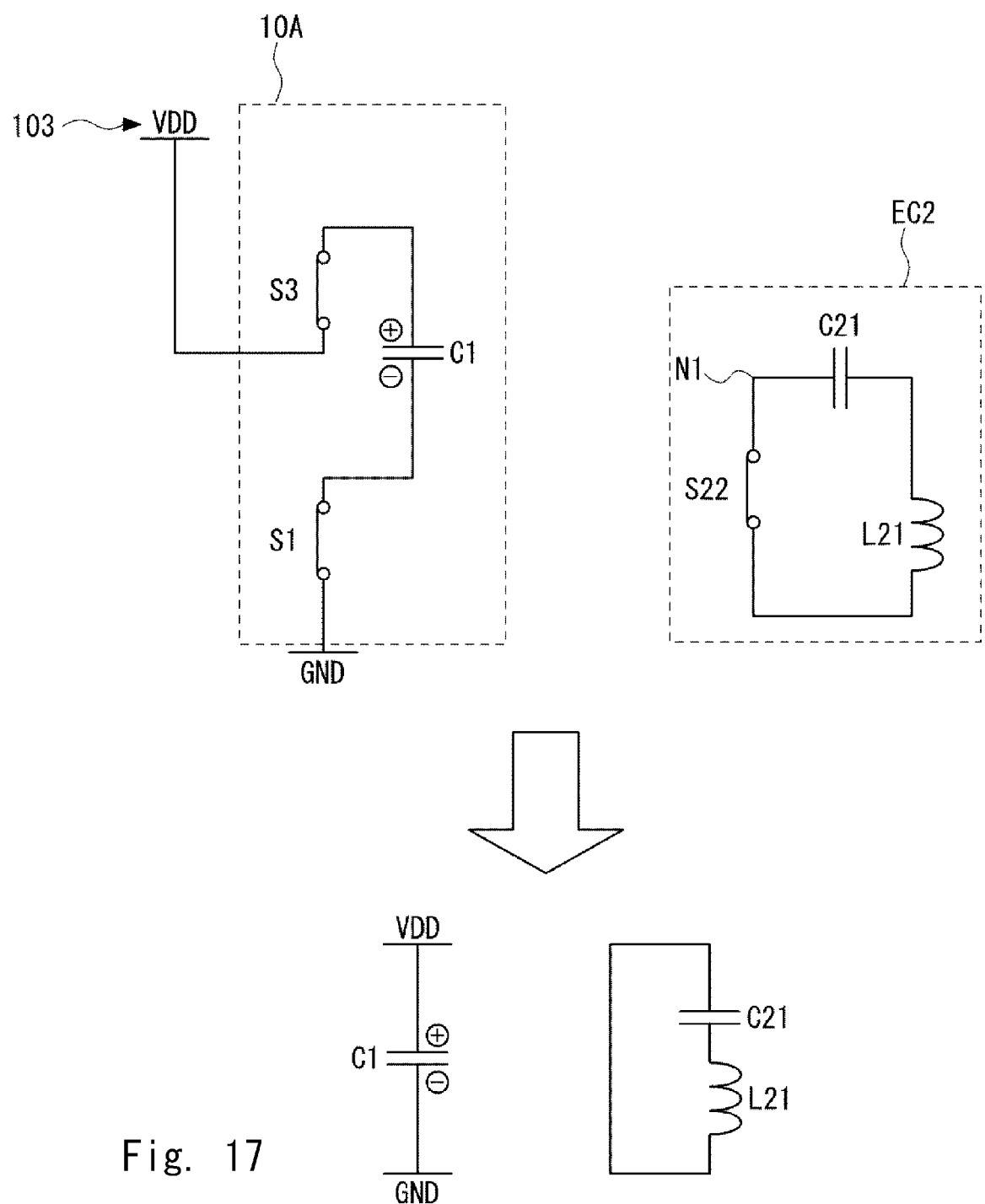
FIG. 17 schematically illustrates an equivalent circuit formed by the switched capacitor circuit and the excitation circuit according to the second exemplary embodiment when the switches S1, S3, and S22 are turned on and the switches S2, S4, and S21 are turned off.

First, the switches S1, S3, and S22 are turned on and the switches S2, S4, and S21 are turned off. FIG. 17 schematically illustrates an equivalent circuit formed by the switched capacitor circuit 10A and the excitation circuit EC2 when the switches S1, S3, and S22 are turned on and the switches S2, S4, and S21 are turned off. In this case, the transformer capacitor C1 is connected between the power supply 103 and the ground, and thereby the transformer capacitor C1 is charged by the power supply voltage VDD. Since both ends of the driving capacitor C21 are short-circuited, the electric charge charged in the driving capacitor C21 in the previous charging cycle is discharged.

Figure 18:
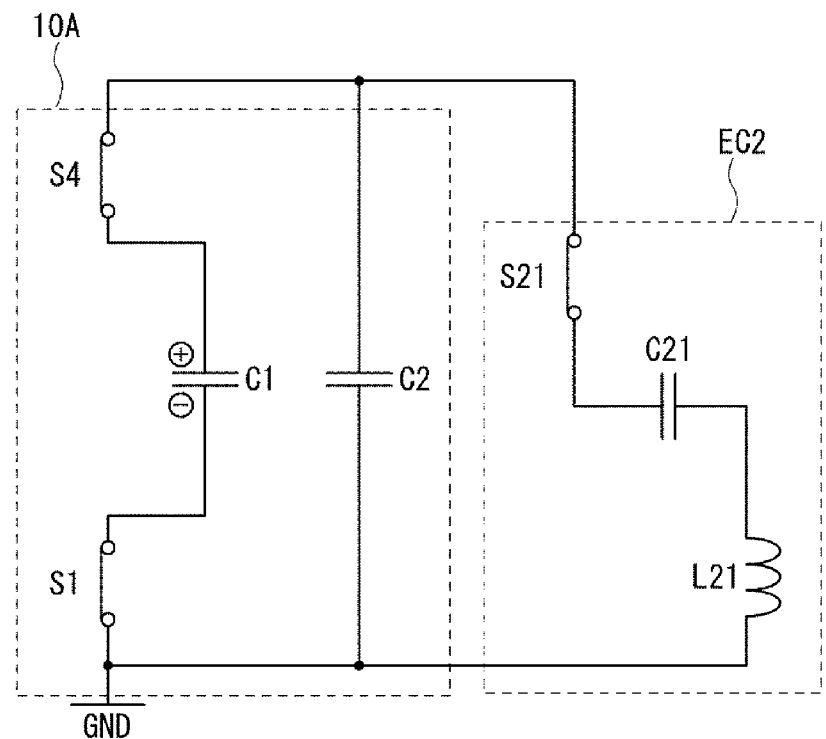
FIG. 18 schematically illustrates an equivalent circuit formed by the switched capacitor circuit and the excitation circuit according to the second exemplary embodiment when the switches S1, S4, and S21 are turned on and the switches S2, S3, and S22 are turned off.
Figure 18:
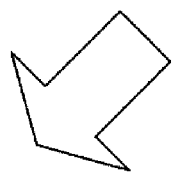
Figure 18:
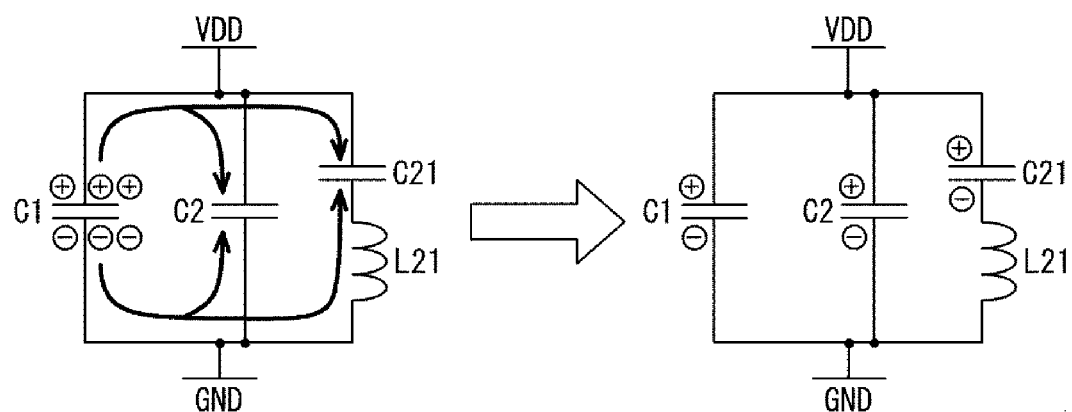

Next, the switches S1, S4, and S21 are turned on and the switches S2, S3, and S22 are turned off. FIG. 18 schematically illustrates an equivalent circuit formed by the switched capacitor circuit 10A and the excitation circuit EC2 when the switches S1, S4, and S21 are turned on and the switches S2, S3, and S22 are turned off. In FIG. 18, the electric charges just after the switching are schematically illustrated in the upper and lower-left circuit diagrams, and the electric charges after being moved by the switching are schematically illustrated in the lower-right circuit diagram. Note that the lower circuit diagrams in FIG. 18 are for facilitating the understanding of the movement of the electric charges, it should be appreciated that the number of the illustrated electric charges is only schematic. In this case, a part of the electric charge charged in the transformer capacitor C1 is moved to the transformer capacitor C2 and driving capacitor C21.

Thus, it can be understood that by performing the charging cycle including two switching steps only once, the driving voltage output from the switched capacitor circuit 10A, that is, the voltage V applied to the driving capacitor C21 becomes a voltage stepped-down lower than the power supply voltage VDD.

Further, as illustrated in FIG. 13, by performing the charging cycles a plurality of times (In FIG. 16, four times), the voltage applied to the driving capacitor C21, that is, the voltage of the node N1 illustrated in FIG. 12 can be continuously and stepwise increased. In the present configuration, by repeating the charging cycle, the voltage applied to the driving capacitor C21 can be controlled in a range from 0 to VDD.

Afterward, by turning on the switch S22 while turning off the switch S21, the LC resonant circuit is formed by the driving capacitor C21 and the transmission coil L21. As a result, the AC signal generated by the resonance flows in the transmission coil L21 and thereby the alternative magnetic field is generated.

Although the configuration in which the switched capacitor circuit 10A applies the driving voltage to the excitation circuit EC2 has been described above, it is merely an example. For example, as in the case of the first exemplary embodiment, a switched capacitor circuit having the same configuration as the switched capacitor circuit 10A may be further disposed to apply a driving voltage to the excitation circuit EC1.

As described above, according to the present configuration, power consumption in the switched capacitor circuit 10A can be suppressed and it is possible to supply to one excitation circuit with the voltage stepped up or stepped down from the power supply voltage output from the single power-saving power supply.

Further, according to the present configuration, even when the driving voltage is stepped up or stepped down, the driving voltage can be controlled in a predetermined range.

Therefore, it is possible to cause strength of the signal received by the reception coil to be a desired value for each scale track.

Third Exemplary Embodiment

Figure 19:
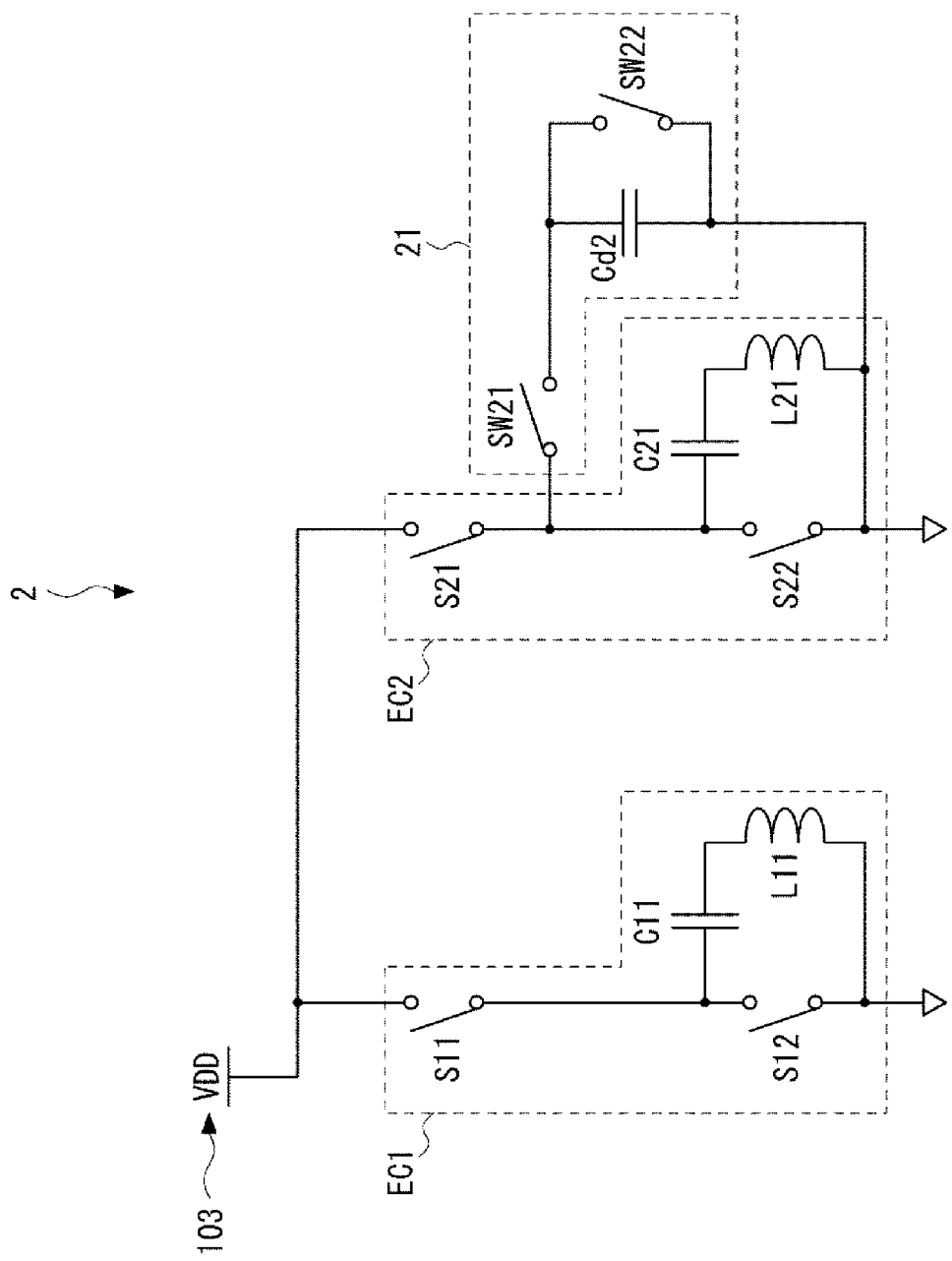
FIG. 19 schematically illustrates a configuration of a main part of a detection head of an encoder according to a third exemplary embodiment.

An encoder according to a third exemplary embodiment will be described below. In the present exemplary embodiment, the driving voltage of the excitation circuit EC2 is supplied by a configuration different from those of the first and second exemplary embodiments. FIG. 19 schematically illustrates a configuration of a main part of a detection head 2 of the encoder according to the third exemplary embodiment. The detection head 2 is provided with a voltage dividing circuit 21 instead of the switched capacitor circuit of the detection heads 1 and 1A.

The voltage dividing circuit 21 is configured as a voltage adjusting circuit of the excitation circuit and includes switches SW21 and SW22 and a voltage dividing capacitor Cd2. The voltage dividing capacitor Cd2 is provided as a transformer capacitor (also referred to as the first transformer capacitor) for controlling the charging voltage of the driving capacitor C21. One end of the switch SW21 (also referred to as a seventh switch) is connected between the switch S21 and the switch S22 in the excitation circuit EC2, and the other end thereof is connected to the voltage dividing capacitor Cd2 and one end of the switch SW22 (also referred to as an eighth switch). The other end of the voltage dividing capacitor Cd2 and the other end of the switch SW22 are connected to the ground.

Figure 20:
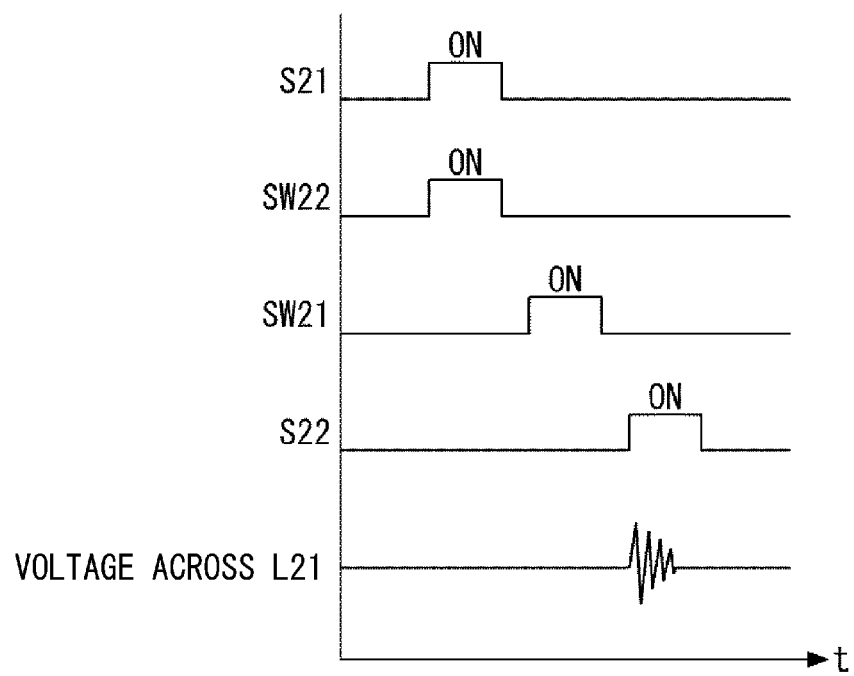
FIG. 20 illustrates ON/OFF timings of switches of an excitation circuit and a voltage dividing circuit in the third exemplary embodiment.

Next, the operation of the detection head 2 will be described. FIG. 20 illustrates ON/OFF timings of the switches of the excitation circuit and the voltage dividing circuit in the third exemplary embodiment. First, by turning on the switches S21 and SW22, and turning off the switches S22 and SW21, the driving capacitor C21 is charged and the voltage dividing capacitor Cd2 is discharged.

Next, by turning on the switch SW21, and turning off the switches S21, S22, and SW22, a part of the electric charge charged in the driving capacitor C21 is moved to the voltage dividing capacitor Cd2. The voltage V across the driving capacitor C21 is expressed by the following expression.

$$V = \frac{C21}{C21 + Cd2} \cdot VDD \quad (3)$$

Then, by turning on the switch S22, and turning off the switches S21, SW21, and SW22, the LC resonance circuit is formed by the driving capacitor C21 and the transmission coil L21. Therefore, the AC signal generated by the resonance flows to the transmission coil L21 to generate the AC magnetic field.

The on/off operation of the switches of the excitation circuit and the voltage dividing circuit is controlled by, for example, the signal processing unit 102.

As described above, according to the present configuration, by adjusting the capacitance value of the voltage dividing capacitor Cd2, the driving voltage of the excitation circuit EC2 can be set to an arbitrary voltage in a range from 0 to the power supply voltage VDD. In the present configuration, the capacitance value of the voltage dividing capacitor Cd2 may be adjusted by determining the capacitance value at the time of circuit design or by using the voltage dividing capacitor Cd2 as a variable capacitor.

By constantly turning off the switch SW21, the excitation circuit EC2 can be driven by the power supply voltage VDD as in the case of the excitation circuit EC1.

Figure 21:
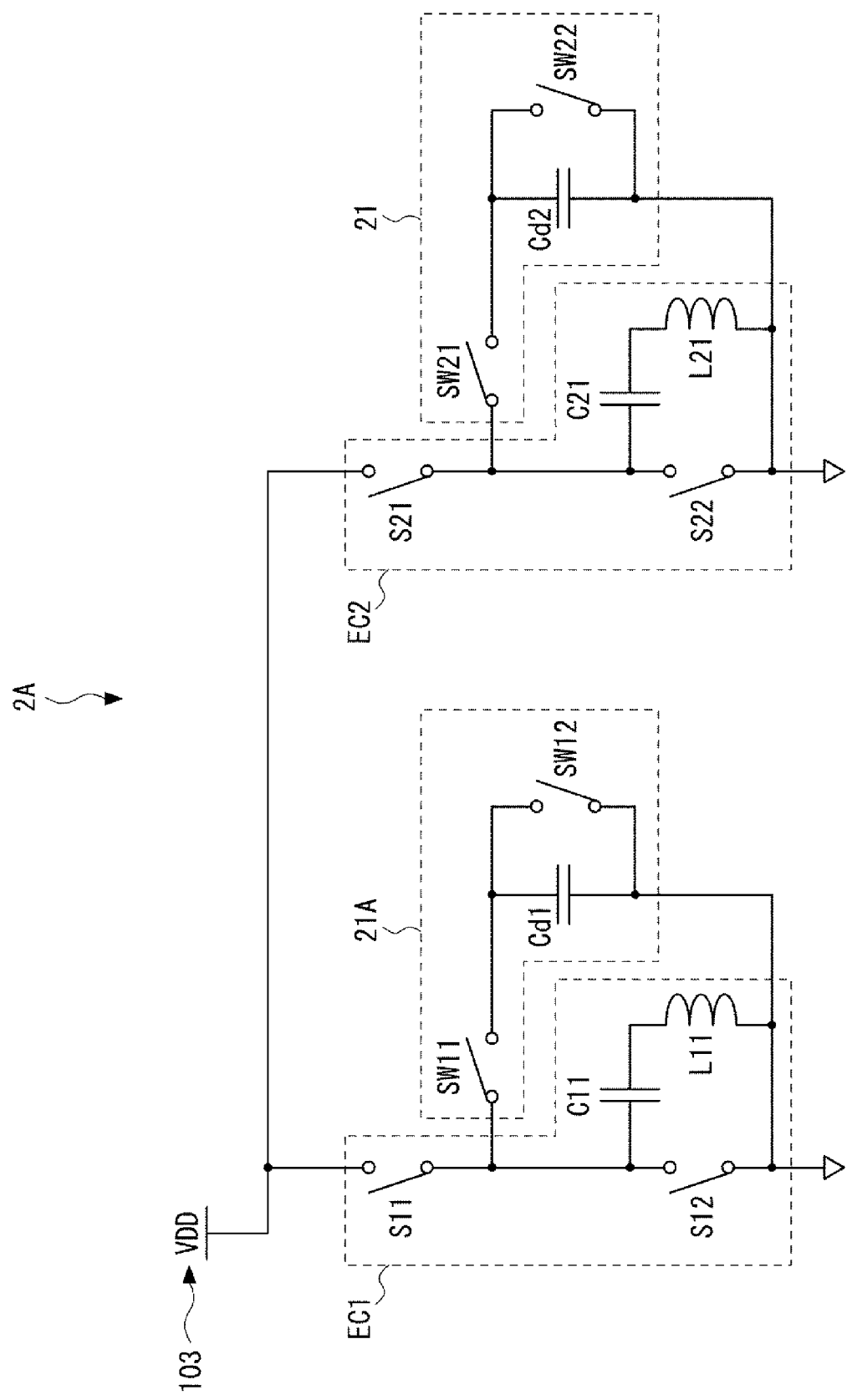
FIG. 21 illustrates a modified example of the detection head according to the third exemplary embodiment.

In addition to the excitation circuit EC2, a voltage dividing circuit corresponding to the excitation circuit EC1 may be provided. FIG. 21 illustrates a modified example of the detection head 2 according to the third exemplary embodiment. As illustrated in FIG. 21, between the excitation circuit EC1 of a detection head 2A and the power supply 103, a voltage dividing circuit 21A having the same configuration as the voltage dividing circuit 21 is provided. The voltage dividing circuit 21A has a switch SW11 (the seventh switch), a switch SW12 (the eighth switch), and a voltage dividing capacitor Cd1 (also referred to as the first transformer capacitor). The switch SW11, the switch SW12, and the voltage dividing capacitor Cd1 correspond to the switch SW21, the switch SW22, and the voltage dividing capacitor Cd2 of the voltage dividing circuit 21, respectively. The operation of the voltage divider circuit 21A and the excitation circuit EC1 is the same as that of the voltage divider circuit 21 and the excitation circuit EC2, and therefore a description thereof will be omitted. According to the present configuration, it can be understood that the excitation circuit EC1 can be driven by the voltage dividing circuit 21A.

Fourth Exemplary Embodiment

Figure 22:
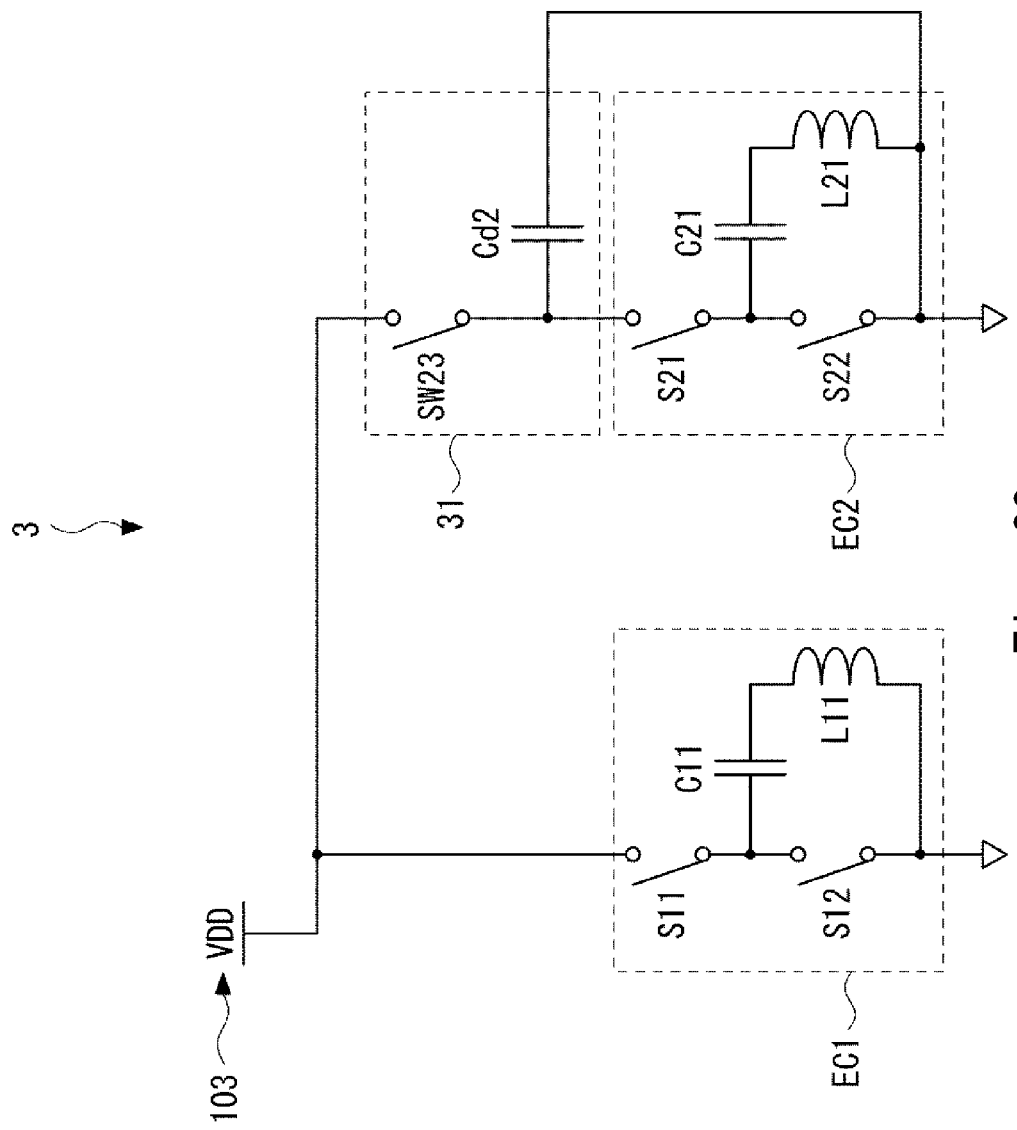
FIG. 22 schematically illustrates a configuration of a main part of a detection head of an encoder according to a fourth exemplary embodiment.

An encoder according to a fourth exemplary embodiment will be described below. The encoder according to the present exemplary embodiment is a modified example of the encoder according to the third exemplary embodiment and a configuration of the voltage dividing circuit in the present exemplary embodiment is different from that in the third exemplary embodiment. FIG. 22 schematically illustrates a configuration of a main part of a detection head 3 of the encoder according to the fourth exemplary embodiment. The detection head 3 has a configuration in which the voltage dividing circuit 21 of the detection head 2 is replaced with a voltage dividing circuit 31.

The voltage dividing circuit 31 has a switch SW23 (also referred to as a ninth switch) and the voltage dividing capacitor Cd2. The switch SW23 is connected between the power supply 103 and the switch S21. One end of the voltage dividing capacitor Cd2 is connected between the switch SW23 and the switch S21, and the other end thereof is connected to the ground.

Figure 23:
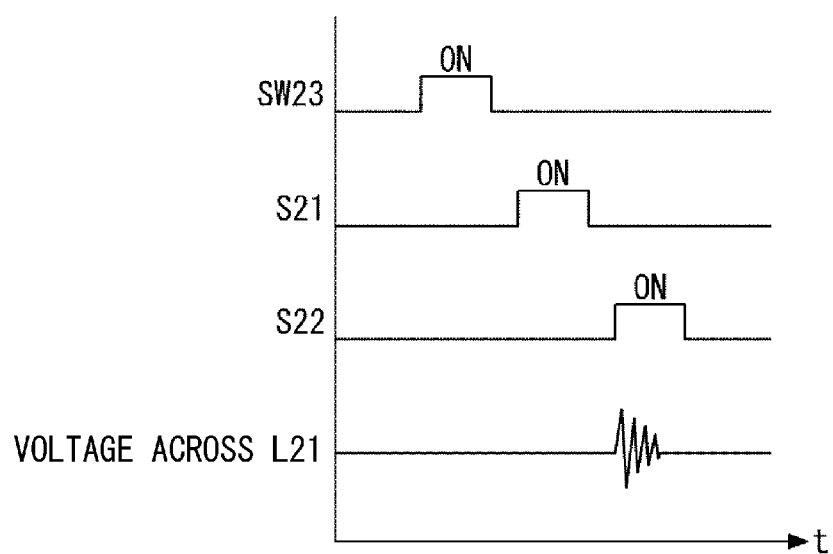
FIG. 23 illustrates ON/OFF timings of switches of an excitation circuit and a voltage dividing circuit in the fourth exemplary embodiment.

The operation of the detection head 3 will be described below. FIG. 23 illustrates ON/OFF timings of the switches of the excitation circuit and the voltage dividing circuit in the fourth exemplary embodiment. First, by turning on the switch SW23, and turning off the switches S21 and S22, the voltage dividing capacitor Cd2 is charged.

Next, by turning on the switch S21, and turning off the switches S22 and SW23, a part of the electric charge charged in the voltage dividing capacitor Cd2 moves to the driving capacitor C21. The voltage V across the driving capacitor C21 is expressed by the following equation (4):

$$V = \frac{C21}{C21 + Cd2} \cdot VDD \quad (4)$$

Then, by turning on the switch S22, and turning off the switches S21 and SW23, the LC resonance circuit is formed by the driving capacitor C21 and the transmission coil L21. Therefore, the AC signal generated by resonance flows to the transmission coil L21 to generate the AC magnetic field.

As described above, according to the present configuration, by adjusting the capacitance value of the voltage dividing capacitor Cd2, the driving voltage of the excitation circuit EC2 can be set to an arbitrary voltage in the range from 0 to the power supply voltage VDD, as in the case of the third exemplary embodiment. In the present configuration, the capacitance value of the voltage dividing capacitor Cd2 may be adjusted by determining the capacitance value at the time of circuit design or by using the voltage dividing capacitor Cd2 as the variable capacitor.

In this configuration, although a part of the electric charge charged in the voltage dividing capacitor Cd2 moves to the driving capacitor C21, not all of the electric charge in the voltage dividing capacitor Cd2 is discharged. Therefore, the second and subsequent charging of the voltage dividing capacitor Cd2 can be performed at a higher speed and with less power consumption than the first charging. Therefore, the power consumption can be reduced as compared with the third exemplary embodiment in which all the electric charges charged in the voltage dividing capacitor Cd2 are discharged.

When the switch SW23 is turned on, the switch S21 is also turned on, so that the excitation circuit EC2 can be driven by the power supply voltage VDD as in the case of the excitation circuit EC1.

In this case, since both the driving capacitor C21 and the voltage dividing capacitor Cd2 are charged with the power supply voltage VDD, and the switches S21 and SW23 are connected in series, and thereby increasing the resistance. Therefore, the charging time becomes longer than that in the third exemplary embodiment. In order to prevent this, a bypass switch for charging the driving capacitor C21 may be provided.

Figure 24:
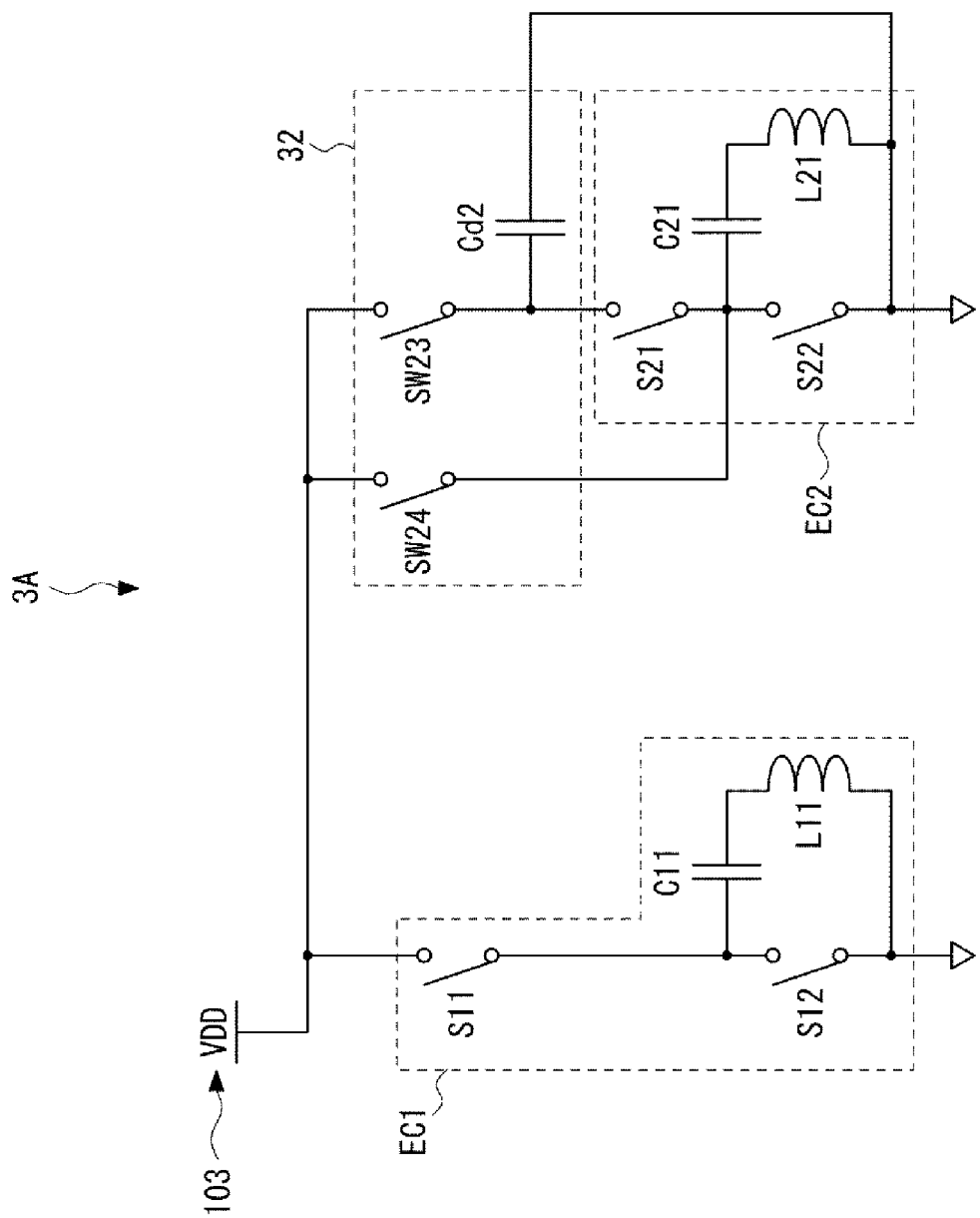
FIG. 24 illustrates a modified example of the detection head according to the fourth exemplary embodiment.

FIG. 24 illustrates a modified example of the detection head 3 according to the fourth exemplary embodiment. A voltage dividing circuit 32 of a detection head 3A illustrated in FIG. 24 has a configuration in which a bypass switch SW24 (also referred to as a tenth switch) is added to the voltage dividing circuit 31. When charging the driving capacitor C21 by the power supply voltage VDD, by turning on the switches SW24 instead of turning on the switches S21 and SW23, the excitation circuit EC2 can be driven by the power supply voltage VDD as in the case of the excitation circuit EC1.

Figure 25:
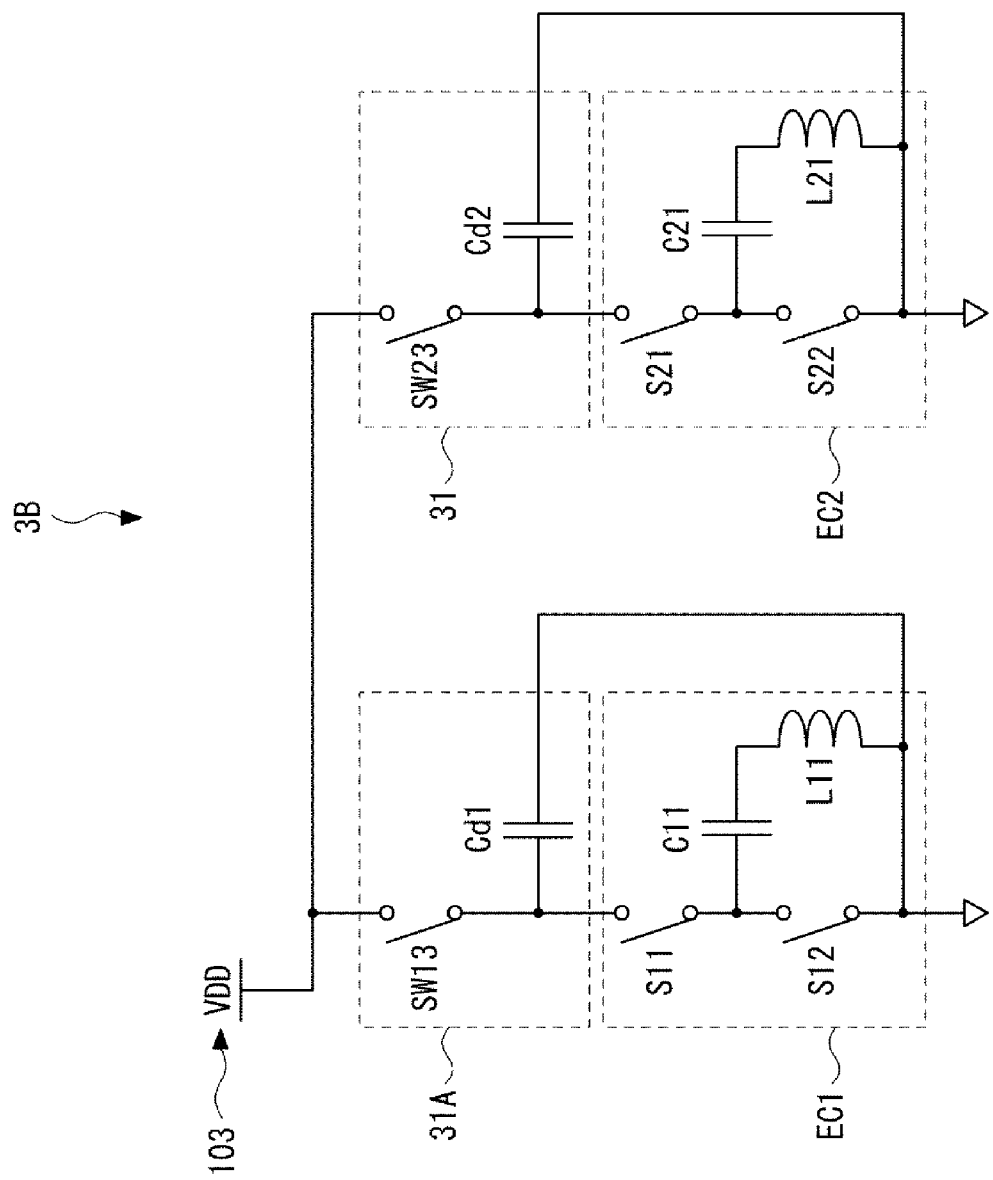
FIG. 25 illustrates a modified example of the detection head according to the fourth exemplary embodiment.

In addition to the excitation circuit EC2, a voltage dividing circuit corresponding to the excitation circuit EC1 may be provided. FIG. 25 illustrates a modified example of the detection head 3 according to the fourth exemplary embodiment. As illustrated in FIG. 25, a voltage dividing circuit 31A is further provided between the excitation circuit EC1 of a detection head 3B and the power supply 103. The voltage dividing circuit 31A has a switch SW13 (the ninth switch) and the voltage dividing capacitor Cd1. The switch SW13 and the voltage dividing capacitor Cd1 correspond to the switch SW23 and the voltage dividing capacitor Cd2 of the voltage dividing circuit 31, respectively. The operation of the voltage dividing circuit 31A and the excitation circuit EC1 is the same as that of the voltage dividing circuit 31 and the excitation circuit EC2, and therefore a description thereof will be omitted. According to the present configuration, it can be understood that the excitation circuit EC1 can be driven by the voltage dividing circuit 31A.

It should be appreciated that the voltage dividing circuit 31 in FIG. 25 may be replaced with the voltage dividing circuit 32, and the voltage dividing circuit 31A in FIG. 25 may be replaced with a voltage dividing circuit having the same configuration as the voltage dividing circuit 32.

Fifth Exemplary Embodiment

Figure 26:
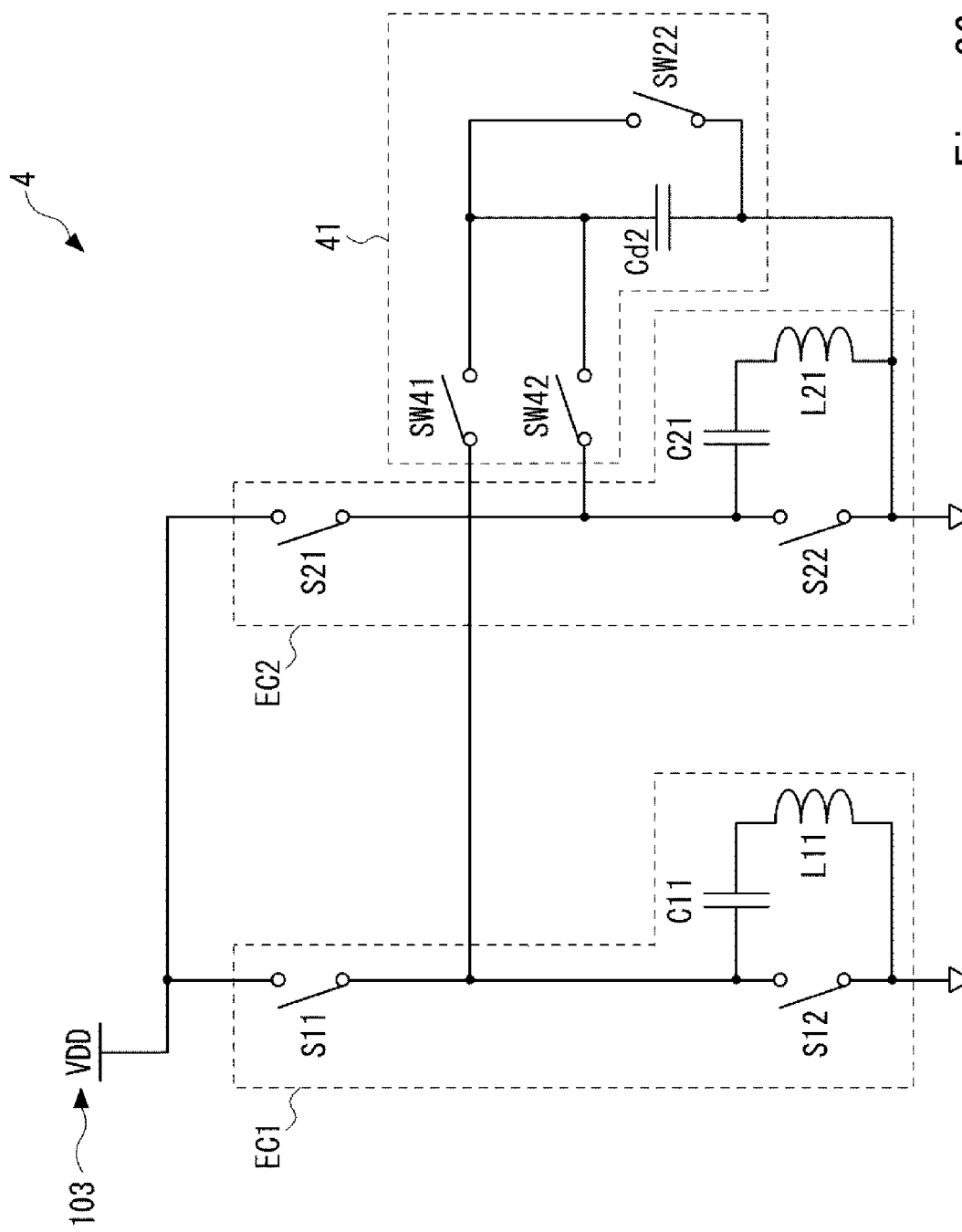
FIG. 26 schematically illustrates a configuration of a main part of a detection head of an encoder according to a fifth exemplary embodiment.

An encoder according to a fifth exemplary embodiment will be described below. A detection head 4 of the encoder according to the present exemplary embodiment is a modified example of the detection head 2 of the encoder according to the third exemplary embodiment and has a configuration that can drive the excitation circuit EC1 or the excitation circuit EC2 with one voltage dividing circuit. FIG. 26 schematically illustrates a configuration of a main part of the detection head 4 of the encoder according to the fifth exemplary embodiment. The detection head 4 has a configuration in which the voltage dividing circuit 21 of the detection head 2 is replaced with a voltage dividing circuit 41.

The voltage dividing circuit 41 has a configuration in which the switch SW21 in the voltage dividing circuit 21 is replaced with a switch SW42 and a switch SW41 is further added. One end of the switch SW41 is connected between the switch S11 and the switch S12 of the excitation circuit EC1, and the other end thereof is connected to an end at a high voltage side of voltage dividing capacitor Cd2. The switches SW41 and SW42 correspond to the eighth switch.

That is, the switches SW22 and SW41, and the voltage dividing capacitor Cd2 constitute a voltage dividing circuit corresponding to the excitation circuit EC1, and the switches SW22 and SW42, and the voltage dividing capacitor Cd2 constitute a voltage dividing circuit corresponding to the excitation circuit EC2.

Therefore, by turning on/off the switch SW41 as in the case of the switch SW21 of the voltage dividing circuit 21, the voltage dividing circuit 41 can drive the excitation circuit EC1 as in the case of the voltage dividing circuit 21. By turning on/off the switch SW42 as in the case of the switch SW21 of the voltage dividing circuit 31, the voltage dividing circuit 41 can drive the excitation circuit EC2 as in the case of the voltage dividing circuit 21.

As described above, according to the present configuration, by adding only one switch to the voltage dividing circuit 21 according to the third exemplary embodiment, either one of the excitation circuit EC1 and the excitation circuit EC2 can be driven by the voltage dividing circuit. Further, according to the present configuration, the number of voltage dividing capacitors and the number of switches can be reduced as compared with the configuration illustrated in FIG. 21, so that the circuit scale can be reduced.

Sixth Exemplary Embodiment

Figure 27:
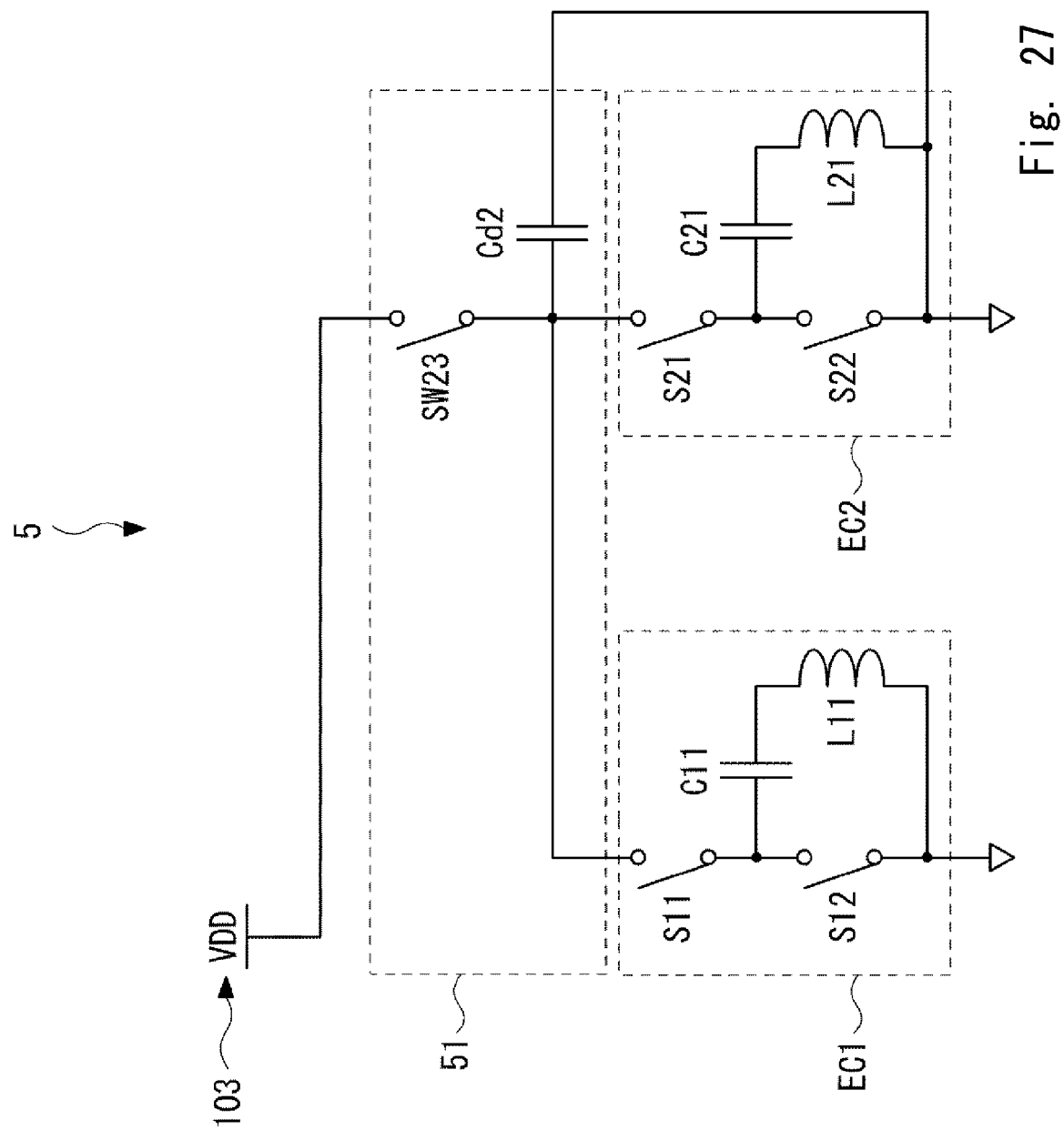
FIG. 27 schematically illustrates a configuration of a main part of a detection head of an encoder according to a sixth exemplary embodiment.

An encoder according to a sixth exemplary embodiment will be described below. A detection head 5 of the encoder according to the present exemplary embodiment is a modified example of the detection head 3 of the encoder according to the fourth exemplary embodiment and has a configuration that can drive both the excitation circuits EC1 and EC2 with one voltage dividing circuit. FIG. 27 schematically illustrates a configuration of a main part of the detection head 5 of the encoder according to the sixth exemplary embodiment. The detection head 5 has a configuration in which the voltage dividing circuit 31 of the detection head 3 is replaced with a voltage dividing circuit 51.

In the voltage dividing circuit 51, an end at a low voltage side of the switch SW23 of the voltage dividing circuit 31 is connected not only the switch S21 and the voltage dividing capacitor Cd2 but also an end at a high voltage side of the switch S11 of the excitation circuit EC1.

That is, when the switch SW23 is controlled together with the switches S11 and S12 of the excitation circuit EC1, the voltage dividing circuit 51 can drive the excitation circuit EC1. When the switch SW23 is controlled together with the switches S21 and S22 of the excitation circuit EC2, the voltage dividing circuit 51 can drive the excitation circuit EC2.

As described above, according to the present configuration, the voltage dividing circuit 51 can drive either one of the excitation circuit EC1 and the excitation circuit EC2. Further, according to the present configuration, the number of voltage dividing capacitors and the number of switches can be reduced as compared with the configuration illustrated in FIG. 25, so that the circuit scale can be reduced.

Other Exemplary Embodiments

The present disclosure is not limited to the above-described embodiments, and can be appropriately changed without departing from the scope of the present disclosure. For example, the number of scale tracks may be three or more and the number of excitation circuits disposed in the detection head may be three or more. In this case, a part of the excitation circuits may be driven by the voltage dividing circuit according to the above-described exemplary embodiments, the rest may be driven by the power supply voltage, or all of them may be driven by the voltage dividing circuit.

In the fourth and fifth exemplary embodiments, although an example of driving any one of the two excitation circuits with one voltage dividing circuit has been described, it should be appreciated that any one of three or more excitation circuits may be driven with one voltage dividing circuit.

Further, the same number of excitation circuits as the voltage dividing circuits may be driven, or as described in the fourth and fifth exemplary embodiments, one voltage dividing circuit may be connected to two or more excitation circuits.

The configuration of the switched capacitor circuit described in the first exemplary embodiment is merely an example, and it should be appreciated that a switched capacitor circuit having other configurations may be used. The first to sixth exemplary embodiments can be combined as desirable by one of ordinary skill in the art. From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A detection head of an encoder comprising:
a plurality of excitation circuits respectively comprising a resonant circuit that includes a driving capacitor and a transmission coil connected in series and configured to generate an alternate-current magnetic field inducing currents in scale coils disposed in a plurality of scale tracks on a scale by connecting both ends of the resonant circuit in a state in which the driving capacitor is charged; and
a voltage adjustment circuit comprising a first transformer capacitor and configured to control a charging voltage of the driving capacitor in a single excitation circuit using the charged first transformer capacitor.

2. The detection head of the encoder according to claim 1, wherein
the single excitation circuit comprises:
a first switch, one end thereof being connected to the voltage adjustment circuit; and
a second switch, one end thereof being connected to the other end of the first switch and the other end thereof being connected to a ground,
one end of the driving capacitor is connected between the first switch and the second switch,
one end of the transmission coil is connected to the other end of the driving capacitor and the other end thereof is connected to the ground,
the driving capacitor is charged by turning on the first switch and turning off the second switch, and
after charging the driving capacitor, the transmission coil generates the alternate-current magnetic field by turning off the first switch and turning on the second switch.

3. The detection head of the encoder according to claim 2, wherein the voltage adjustment circuit is configured as a switched capacitor circuit that charges the driving capacitor by a voltage generated by stepping up or stepping down a power supply voltage output from a power supply.

4. The detection head of the encoder according to claim 3, wherein
the switched capacitor circuit comprises:
a third switch, one end thereof being connected to the ground;
a fourth switch, one end thereof being connected to the other end of the third switch and one end of the first transformer capacitor, and the other end thereof being connected to the power supply; and
a fifth switch, one end thereof being connected to the power supply, and the other end thereof being connected to the other end of the first transformer capacitor and the first switch of the single excitation circuit.

5. The detection head of the encoder according to claim 4, wherein
the driving capacitor and the first transformer capacitor are charged by turning on the first, third, and fifth switches, and turning off the second and fourth switches,
a voltage generated by adding a voltage due to electric charge charged in the driving capacitor and a voltage due to electric charge charged in the first transformer capacitor is applied to the driving capacitor by turning on the first, and fourth switches, and turning off the second, third, and fifth switches, and
the transmission coil generates the alternate-current magnetic field by turning on the second switch while turning off the first switch.

6. The detection head of the encoder according to claim 4, wherein
the first transformer capacitor is charged by turning on the third and fifth switches, and turning off the first, second, and fourth switches,
the driving capacitor is charged by moving a part of the electric charge charged in the first transformer capacitor to the driving capacitor by turning on the first switch, and turning off the second to fifth switches, and
the transmission coil generates the alternate-current magnetic field by turning on the second switch while turning off the first switch.

7. The detection head of the encoder according to claim 3, wherein
the switched capacitor circuit comprises:
a second transformer capacitor;
a third switch, one end thereof being connected to the ground;
a fourth switch, one end thereof being connected to the other end of the third switch and one end of the second transformer capacitor, and the other end thereof being connected to the power supply;
a fifth switch, one end thereof being connected to the power supply; and
a sixth switch, one end thereof being connected to the other end the fifth switch and the other end of the second transformer capacitor, and the other end thereof being connected to the first switch of the single excitation circuit.

8. The detection head of the encoder according to claim 7, wherein
the driving capacitor is charged by performing a charging cycle including a first step and a second step one or more times,
in the first step, the first and second transformer capacitors are charged by turning on the third, fifth, and sixth switches and turning off the first, second, and fourth switches,
in the second step, a voltage stepped up above the power supply voltage by moving the electric charge charged in the first transformer capacitor to the driving capacitor and the first transformer capacitor by turning on the first, fourth, and sixth switches and turning off the second, third, and fifth switches, and
the transmission coil generates the alternate-current magnetic field by turning on the second switch while turning off the first switch.

9. The detection head of the encoder according to claim 7, wherein
the driving capacitor is charged by performing a charging cycle including a first step and a second step one or more times,
in the first step, the first transformer capacitor is charged by turning on the second, third, and fifth switches and turning off the first, fourth, and sixth switches,
in the second step, the second transformer capacitor and the driving capacitor are charged by moving the electric charge charged in the first transformer capacitor to the second transformer capacitor and the driving capacitor by turning on the first, third, and sixth switches and turning off the second, fourth, and fifth switches, and
the transmission coil generates the alternate-current magnetic field by turning on the second switch while turning off the first switch.

10. The detection head of the encoder according to claim 2, wherein
the voltage adjustment circuit comprises:
a seventh switch, one end thereof being connected between the first switch and the second switch of the single excitation circuit; and
an eighth switch connected in parallel to the first transformer capacitor, one end thereof being connected to the seventh switch and the other end thereof being connected to the ground,
the driving capacitor of the single excitation circuit is charged and the first transformer capacitor is discharged by turning on the eighth switch and the first switch of the single excitation circuit and turning off the seventh switch and the second switch of the single excitation circuit,
a part of the electric charge charged in the driving capacitor of the single excitation circuit is moved to the first transformer capacitor by turning on the seventh switch, and turning off the eighth switch, and the first and second switches of the single excitation circuit, and
the transmission coil generates the alternate-current magnetic field by turning on the second switch of the single excitation circuit, and the seventh switch, the eighth switch, and the first switch of the single excitation circuit.

11. The detection head of the encoder according to claim 10, wherein
the voltage adjustment circuit comprises two or more of the seventh switches connected in parallel,
the two or more of the seventh switches are connected to the first switches of two or more of the excitation circuits, respectively, and
by selectively turning on/off any one of the two or more of the seventh switches, the single excitation circuit corresponding to the seventh switch selectively turned on/off.

12. The detection head of the encoder according to claim 2, wherein
the voltage adjustment circuit comprises a ninth switch, one end thereof being connected between the power supply outputting the power supply voltage and the first switch of the connected excitation circuit,
one end of the first transformer capacitor is connected to the ninth switch and the other end thereof is connected to the ground,
the first transformer capacitor is charged by turning on the ninth switch and turning off the first and second switches of the single excitation circuit,
the electric charge charged in the first transformer capacitor is moved to the driving capacitor of the single excitation circuit by turning on the first switch of the single excitation circuit, and turning off the ninth switch and the second switch of the single excitation circuit, and the transmission coil generates the alternate-current magnetic field by turning on the second switch of the single excitation circuit, and the ninth switch and the first switch of the single excitation circuit.

13. The detection head of the encoder according to claim 12, wherein the voltage adjustment circuit further comprises a tenth switch one end thereof being connected to the ground and the other end thereof being connected between the first switch and the second switch of the single excitation circuit, the driving capacitor is charged by turning on the tenth switch, and turning off the ninth switch, and the first and second switches of the single excitation circuit, and the transmission coil generates the alternate-current magnetic field by turning on the second switch of the single excitation circuit, and the ninth and tenth switches, and the first switch of the single excitation circuit.

14. The detection head of the encoder according to claim 12, wherein the ninth switch of the voltage adjustment circuit is connected between the first switches of two or more excitation circuits and the first transformer capacitor, and the single excitation circuit including the first and second switches to be controlled is driven by controlling the ninth switch together with the first and second switches of any one of the two or more excitation circuits.

15. The detection head of the encoder according to claim 10, wherein two or more voltage adjustment circuit respectively corresponding to the two or more excitation circuits in the plurality of the excitation circuits are disposed.

16. An encoder comprising:

a scale comprising a plurality of scale tracks, scale coils are disposed in each scale track;

a detection head configured to induce currents in the scale coils disposed in the scale tracks and to detect an alternate-current magnetic field inducing currents generated by the induced currents; and a signal processing unit configured to a displacement of the scale based on a detection result, wherein the detection head of an encoder comprises:

a plurality of excitation circuits respectively comprising a resonant circuit that includes a driving capacitor and a transmission coil connected in series and configured to generate the alternate-current magnetic field inducing currents in the scale coils disposed in the scale tracks on the scale by connecting both ends of the resonant circuit in a state in which the driving capacitor is charged; and a voltage adjustment circuit comprising a first transformer capacitor and configured to control a charging voltage of the driving capacitor in a single excitation circuit using the charged first transformer capacitor.

* * * * *